(12) United States Patent
Fujii et al.

(10) Patent No.: US 9,061,505 B2
(45) Date of Patent: Jun. 23, 2015

(54) INK FOR INKJET, INK CARTRIDGE USING THE INK, INKJET RECORDER AND INK RECORDED MATTER

(71) Applicants: Hidetoshi Fujii, Shizuoka (JP); Hiroshi Gotou, Shizuoka (JP)

(72) Inventors: Hidetoshi Fujii, Shizuoka (JP); Hiroshi Gotou, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/189,066

(22) Filed: Feb. 25, 2014

(65) Prior Publication Data

US 2014/0272327 A1 Sep. 18, 2014

(30) Foreign Application Priority Data

Mar. 13, 2013 (JP) .................. 2013-049897

(51) Int. Cl.

| | |
|---|---|
| B41M 5/00 | (2006.01) |
| B41J 2/175 | (2006.01) |
| B41M 5/50 | (2006.01) |
| C09D 11/326 | (2014.01) |
| C09D 11/037 | (2014.01) |
| C09D 11/36 | (2014.01) |
| C09D 11/033 | (2014.01) |
| C09D 11/322 | (2014.01) |
| C09D 11/38 | (2014.01) |

(52) U.S. Cl.
CPC ...... *B41J 2/17503* (2013.01); *Y10T 428/24802* (2015.01); *B41M 5/50* (2013.01); *C09D 11/326* (2013.01); *C09D 11/037* (2013.01); *C09D 11/36* (2013.01); *C09D 11/033* (2013.01); *C09D 11/322* (2013.01); *C09D 11/38* (2013.01)

(58) Field of Classification Search
CPC ..... B41M 5/50; C09D 11/322; C09D 11/326; C09D 11/033; C09D 11/037; C09D 11/36; B41J 2/17503
USPC .............. 428/32.1; 106/31.65, 31.86; 347/86
See application file for complete search history.

(56) References Cited

U.S. PATENT DOCUMENTS

| | | | |
|---|---|---|---|
| 2002/0057310 A1* | 5/2002 | Sekiya ............................ 347/47 |
| 2003/0166742 A1 | 9/2003 | Hirasa et al. | |
| 2007/0197685 A1 | 8/2007 | Aruga et al. | |
| 2008/0233363 A1 | 9/2008 | Goto et al. | |
| 2009/0043028 A1 | 2/2009 | Matsuyama et al. | |
| 2009/0098312 A1 | 4/2009 | Goto et al. | |
| 2009/0114120 A1* | 5/2009 | McIntyre et al. ........... 106/31.65 |
| 2009/0176070 A1 | 7/2009 | Goto et al. | |
| 2010/0196601 A1 | 8/2010 | Goto et al. | |
| 2010/0196602 A1 | 8/2010 | Koyano et al. | |
| 2010/0295891 A1 | 11/2010 | Goto et al. | |
| 2011/0057981 A1 | 3/2011 | Aruga et al. | |
| 2011/0164086 A1 | 7/2011 | Ggoto et al. | |
| 2011/0236649 A1 | 9/2011 | Nishiki et al. | |
| 2011/0310166 A1 | 12/2011 | Namba et al. | |
| 2012/0098883 A1 | 4/2012 | Matsuyama et al. | |
| 2012/0207983 A1 | 8/2012 | Matsuyama et al. | |
| 2012/0249666 A1 | 10/2012 | Maki et al. | |
| 2012/0293582 A1 | 11/2012 | Goto et al. | |
| 2012/0320137 A1 | 12/2012 | Fujii et al. | |
| 2013/0002776 A1 | 1/2013 | Nagashima et al. | |
| 2013/0065028 A1 | 3/2013 | Fujii et al. | |
| 2013/0070017 A1 | 3/2013 | Fujii et al. | |
| 2013/0071637 A1 | 3/2013 | Matsuyama et al. | |
| 2013/0113860 A1 | 5/2013 | Gotou et al. | |
| 2013/0155145 A1 | 6/2013 | Gotou et al. | |
| 2013/0176369 A1 | 7/2013 | Gotou et al. | |
| 2013/0194343 A1 | 8/2013 | Yokohama et al. | |
| 2013/0194344 A1 | 8/2013 | Yokohama et al. | |
| 2013/0194345 A1 | 8/2013 | Tamai et al. | |
| 2013/0321525 A1 | 12/2013 | Fujii et al. | |
| 2013/0323474 A1 | 12/2013 | Gotou et al. | |
| 2014/0002539 A1 | 1/2014 | Goto et al. | |

FOREIGN PATENT DOCUMENTS

| | | |
|---|---|---|
| CN | 1408796 A | 4/2003 |
| CN | 102952426 A | 3/2013 |
| JP | 2005-297549 | 10/2005 |
| JP | 2012-107210 | 6/2012 |
| WO | WO2012/124790 | 9/2012 |

OTHER PUBLICATIONS

U.S. Appl. No. 13/973,042, filed Aug. 22, 2013.
European Search Report dated Jul. 21, 2014 in corresponding European patent application No. 14 15 9397.0.
Mar. 25, 2015 Chinese official action in corresponding Chinese patent application No. 201410092764.8.

* cited by examiner

*Primary Examiner* — Betelhem Shewareged
(74) *Attorney, Agent, or Firm* — Cooper & Dunham LLP

(57) ABSTRACT

An ink for inkjet includes water, and a mixture of hydrosoluble organic materials in an amount of from 40 to 70% by weight. The mixture of hydrosoluble organic materials includes N,N-dimethylacrylamide and/or N,N-diethylacrylamide, the total content of which is from 10 to 70% by weight based on total weight of the ink.

9 Claims, 4 Drawing Sheets

INK FOR INKJET, INK CARTRIDGE USING THE INK, INKJET RECORDER AND INK RECORDED MATTER

CROSS-REFERENCE TO RELATED APPLICATIONS

This patent application is based on and claims priority pursuant to 35 U.S.C. §119 to Japanese Patent Application No. 2013-049897, filed on Mar. 13, 2013, in the Japan Patent Office, the entire disclosure of which is hereby incorporated by reference herein.

BACKGROUND

1. Technical Field

The present invention relates to an ink for inkjet, an ink cartridge using the ink, an inkjet recorder and an ink recorded matter.

2. Description of the Related Art

Inkjet recording methods are advantageous in comparison with other recording methods in that, since the process is simple, full colorization is easy and high-definition images can be obtained with even a simple apparatus configuration. Dye-based ink in which various hydrosoluble dyes are dissolved in water or a mixture of water and a hydrosoluble wetter is used as the ink for inkjet.

In recent years, demand for high-speed printing has continued to increase. However, problems such as curl occur after printing in a case in which aqueous ink is used for plain paper. Aqueous ink contains large amounts of water, which swells the fiber of the paper and results in curl.

On the other hand, with oil-based ink, since it does not contain water, curl is not a serious problem. However, the oil-based ink penetrates into a recording medium more deeply than aqueous ink, which degrades the image quality such that image density is low and blurring and strike-through significantly occur. In short, ink for inkjet recording satisfies the competing requirements of minimal curl and superior image quality has not been attained so far.

Methods of adding a particular sugar group, sugar alcohol, amide compound as an anti-curl agent to prevent curl of plain paper when aqueous ink is used are suggested. Although successful in some degree, these methods still face the problems of curl when printing images requiring a large amount of ink at a high speed.

JP-2005-297549-A describes methods of increasing the amount of solvent in aqueous ink to prevent occurrence of curl. However, since the ratio of the solvent increases, as in the case of the oil-based ink, the image quality is low and the viscosity of the ink tends to increase, which causes a problem with regard to ink discharge reliability.

A method of increasing the amount of hydrophobic solvent to prevent occurrence of curl is suggested. However, the results are unsatisfactory.

Currently, prevention of curl and improved image quality are incompatible.

JP-2012-107210-A proposes an ink including 2-pyrrolidone, 1,3-dimethyl-2-imidazolidinone, β-methoxy-N,N-dimethylpropion amide. This ink produces the curl preventing effect, but an ink including a large amount of these materials has a problem of serious back curl after time passes.

Because of these reasons, a need exists for an ink for recording, capable of preventing curl and producing high-quality images when printing on plain papers.

SUMMARY

Accordingly, one object of the present invention is to provide an ink for recording, capable of preventing curl and producing high-quality images when printing on plain papers.

Another object of the present invention is to provide an ink cartridge containing the ink.

A further object of the present invention is to provide an inkjet recorder using the ink.

Another object of the present invention is to provide an ink recorded matter printed by the ink.

These objects and other objects of the present invention, either individually or collectively, have been satisfied by the discovery of an ink for inkjet, including water and a mixture of hydrosoluble organic materials in an amount of from 40 to 70% by weight. The mixture of hydrosoluble organic materials includes N,N-dimethylacrylamide and/or N,N-diethylacrylamide, the total content of which is from 10 to 70% by weight based on total weight of the ink.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION

Figure 1:
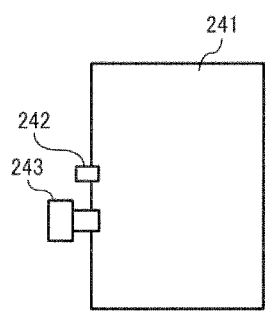
FIG. 1 is a schematic view illustrating an embodiment of ink bag of the ink cartridge of the present invention.

The present invention provides an ink for recording, capable of preventing curl and producing high-quality images when printing on plain papers.

The ink for inkjet of the present invention includes at least water and a mixture of hydrosoluble organic materials, and other components such as a pigment and a hydrodispersible resin when necessary.

<Hydrosoluble Organic Material>

The hydrosoluble organic material is an organic material, which can be dissolved in water serving as a dispersion medium of an ink at 25° C. Specific examples of such a hydrosoluble organic material include wetting agents, polymer compounds, surfactants, penetrants, antirusts, fungicides, dyes, etc., which are soluble in water.

Organic pigments, inorganic pigments, resins, etc., which are insoluble and dispersed in water, are not the hydrosoluble organic material.

The ink preferably includes the mixture of hydrosoluble organic materials in an amount of from 40 to 70% by weight, more preferably from 50 to 70% by weight, and furthermore preferably from 60 to 70% by weight. When greater than 70% by weight, the ink deteriorates in dischargeability.

The mixture of hydrosoluble organic materials includes N,N-dimethylacrylamide and/or N,N-diethylacrylamide. These lower the viscosity of an ink even when including the mixture of hydrosoluble organic materials too much, and keep the viscosity low enough to be dischargeable and improve the discharge stability.

The N,N-dimethylacrylamide and the N,N-diethylacrylamide are polymerized by heat, light, azo compounds and metallic ions to increase the ink viscosity and deteriorate preservability thereof. The total content of the N,N-dimethylacrylamide and the N,N-diethylacrylamide is preferably from 10 to 70% by weight, more preferably from 20 to 50% by weight, and furthermore preferably from 25 to 40% by weight.

When less than 10% by weight, the ink viscosity increases and the discharge reliability lowers. When greater than 70% by weight, the ink deteriorates in preservability.

When the content of the N,N-dimethylacrylamide and the N,N-diethylacrylamide is too much, the ink may deteriorate in preservability. Therefore, the ink preferably includes a hydrosoluble organic material having equilibrium water content not less than 33% by weight at 23° C. and 80% RH besides the N,N-dimethylacrylamide and the N,N-diethylacrylamide.

The equilibrium water content of the hydrosoluble organic solvent represents the amount of water therein obtained when a mixture of the hydrosoluble organic solvent and water are released into air at a constant temperature and humidity and the evaporation of the water in the solvent and the absorption of the water in air are in an equilibrium condition.

To be specific, the equilibrium water content can be obtained as follows: while keeping the temperature and the humidity in a desiccator using a saturated potassium chloride solution at 22° C. to 24° C. and 77% to 83%, a petri dish on which 1 g of each hydrosoluble organic solvent is placed is preserved in the desiccator until no mass change occurs followed by calculation based on the following relationship.

Equilibrium water content (%)=Water amount absorbed in organic solvent/(Content of organic solvent+Water amount absorbed in organic solvent)×100

As the hydrosoluble organic material having equilibrium water content not less than 33% by weight at 23° C. and 80% RH, 1,3-dimethyl-2-imidazolidinone, β-methoxy-N,N-dimethylpropion amide and 2-pyrrolidone are preferably used because of keeping the viscosity of an ink low enough to be dischargeable even when including the mixture of hydrosoluble organic materials too much.

However, only the N,N-dimethylacrylamide or the N,N-diethylacrylamide can lower the viscosity more. Each of 1,3-dimethyl-2-imidazolidinone, β-methoxy-N,N-dimethylpropion amide and 2-pyrrolidone has a high equilibrium water content. When they are included too much, the ink has too high a power of retaining water and water is difficult to evaporate after adhering to a paper, which is assumed to cause back curl for a long time. The total content of these is preferably from 5 to 50% by weight, and more preferably from 10 to 20% by weight based on total weight of the ink.

When less than 5% by weight, the ink viscosity increases and the discharge reliability lowers. When greater than 50% by weight, back curl may occur as time passes.

Specific examples of other hydrosoluble organic materials having an equilibrium moisture content of 33% by weight or less at 23° C. and 80% RH include, but are not limited to, polyols, polyol alkyl ethers, polyol aryl ethers, nitrogen-containing heterocyclic compounds, amides, amines, sulfur-containing compounds, propylene carbonates, ethylene carbonates and saccharides.

Specific examples thereof include, but are not limited to, 1,2,3-butane triol (boiling point: 175° C./33 hPa, 38% by weight), 1,2,4-butane triol (boiling point: 190 to 191° C./24 hPa, 4% by weight), glycerin (boiling point: 290° C., 49% by weight), diglycerin (boiling point: 270° C./20 hPa, 38% by weight), triethylene glycol (boiling point: 285° C., 39% by weight), tetraethylene glycol (boiling point: 324 to 330° C., 37% by weight), diethylene glycol (boiling point: 245° C., 43% by weight), 1,3-butane diol (boiling point: 203 to 204° C., 35% by weight), and 3-methyl-1,3-butane diol (boiling point: 203° C., 23% by weight), β-methoxy-N,N-dimethylpropion amide (boiling point: 216° C., 33% by weight), 2-pyrrolidone (boiling point: 245° C., 39% by weight) and 1,3-dimethyl-2-imidazolidinone (boiling point: 225° C., 38% by weight).

In the present invention, the mixture of hydrosoluble organic materials includes diethylene glycol mono-isobutyl ether and/or dipropylene glycol mono-isobutyl ether as a surfactant to lower a dynamic surface tension of the ink at 15 ms such that the image density and curl prevention are compatible.

When the ink is in a dynamic status such as formation of an ink drop, the ink tends to have a high surface tension (poor wettability) because the surfactant has a concentration distribution and an amount of adsorption different from those when static.

The surface tension close to practical use of the ink is measured, a time for forming the surface and the surface tension changing therewith which cannot be measured by static methods are measured.

The ink for inkjet of the present invention having a dynamic surface tension of from 25 to 35 mN/m at 25° C. and 15 ms compatibilizes the image density and curl prevention.

When the dynamic surface tension is less than 25 mN/m, the ink dischargeability may have a problem. When greater than 35 mN/m, the image quality may deteriorate.

The mixture of hydrosoluble organic materials preferably includes diethylene glycol mono-isobutyl ether and/or dipropylene glycol mono-isobutyl ether in an amount of from 5 to 30% by weight.

Besides the above materials, the mixture of hydrosoluble organic materials may include known additives such as wetters, penetrants, surfactants, ph regulators, antisepsis and anti-fungal agents, anti-corrosion agents and chelate reagents.

<Wetters>

Specific examples of the welters include, but are not limited to, 3-methyl-1,3-butane diol (boiling point: 203° C., 23% by weight), isobutyl diglycol (boiling point: 220° C., 10% by weight), tripropylene glycol monomethyl ether (boiling point: 242° C., 13% by weight), 2-(2-isopropyloxyethoxy) ethanol (boiling point: 207° C., 18% by weight), isopropyl glycol (boiling point: 142° C., 15% by weight), diethyl diglycol (boiling point: 189° C., 10% by weight), propyl propylene glycol (boiling point: 150° C., 17% by weight), tributyl citrate (boiling point: 234° C., 4% by weight), propyl propylene diglycol (boiling point: 220° C., 5% by weight), butyl propylene glycol (boiling point: 170° C., 6% by weight), butyl propylene diglycol (boiling point: 212° C., 3% by weight), methyl propylene glycol acetate (boiling point: 146° C., 8% by weight), and Methylene glycol dimethyl ether (boiling point: 216° C., 20% by weight), N,N-dimethyl acrylamide (boiling point: 171° C., 31% by weight), N,N-diethyl acrylamide (boiling point: 56° C./3 mm Hg, 11% by weight), dipropylene glycol (boiling point: 232° C.), 1,5-pentane diol (boiling point: 242° C.), propylene glycol (boiling point: 187° C.), 2-methyl-2,4-pentane diol (boiling point: 197° C.), ethylene glycol (boiling point: 196 to 198° C.), tripropylene glycol (boiling point: 267° C.), hexylene glycol (boiling point: 197° C.), polyethylene glycol (viscostic liquid to solid), polypropylene glycol (boiling point: 187° C.), 1,6-hexane diol (boiling point: 253 to 260° C.) and 1,2,6-hexane triol (boiling point: 178° C.).

Further, polyol alkyl ethers such as ethylene glycol monoethyl ether (boiling point: 135° C.), ethylene glycol monobutyl ether (boiling point: 171° C.), diethylene glycol monomethyl ether (boiling point: 194° C.), diethylene glycol monoethyl ether (boiling point: 197° C.), diethylene glycol monobutyl ether (boiling point: 231° C.), ethylene glycol mono-2-ethylhexyl ether (boiling point: 229° C.) and propylene glycol monoethyl ether (boiling point: 132° C.) can be used.

In addition, polyol aryl ethers such as ethylene glycol monophenyl ether (boiling point: 237° C.) and ethylene glycol monobenzyl ether can be used.

Further, nitrogen-containing heterocyclic compounds such as 2-pyrolidone (boiling point: 250° C., melting point: 25.5° C., 47% by weight to 48% by weight), N-methyl-2-pyrolidone (boiling point: 202° C.), 1,3-dimethyl-2-imidazolidinone (boiling point: 226° C.), c-caprolactam (boiling point: 270° C.) and y-butylolactone (boiling point: 204 to 205° C.) can be used.

In addition, amides such as formamide (boiling point: 210° C.), N-methyl formamide (boiling point: 199 to 201° C.), N,N-dimethylformamide (boiling point: 153° C.), and N,N-diethylformamide (boiling point: 176 to 177° C.) can be used.

Further, amines such as monoethanol amine (boiling point: 170° C.), diethanol amine (boiling point: 268° C.), triethanol amine (boiling point: 360° C.), N,N-dimethyl monoethanol amine (boiling point: 139° C.), N-methyl diethanol amine (boiling point: 243° C.), N-methylethanol amine (boiling point: 159° C.), N-phenyl ethanol amine (boiling point: 282 to 287° C.), and 3-aminopropyl diethyl amine (boiling point: 169° C.) can be used.

In addition, sulfur-containing compounds such as dimethyl sulphoxide (boiling point: 139° C.), sulfolane (boiling point: 285° C.), and thiodiglycol (boiling point: 282° C.) can be used.

Saccharides are also preferable as other solid hydrosoluble organic materials.

Specific examples of the saccharides include, but are not limited to, monosaccharides, disaccharides, oligosaccharides (including trisaccharides and tetrasaccharides), and polysaccharides. Specific examples thereof include, but are not limited to, glucose, mannose, fructose, ribose, xylose, arabinose, galactose, maltose, cellobiose, lactose, saccharose, trehalose, and maltotriose. Polysaccharides represent sugar in a broad sense and are materials that are present widely in nature, for example, α-cyclodextrine and cellulose.

In addition, specific examples of derivatives of these saccharides include, but are not limited to, reducing sugars (for example, sugar alcohols (represented by $HOCH_2(CHOH)_nCH_2OH$, where n represents an integer of from 2 to 5) of the sugar groups specified above, oxidized sugars (e.g., aldonic acid and uronic acid), amino acid, and thio acid. Among these, sugar alcohols are preferable and specific examples thereof include, but are not limited to, maltitol and sorbit.

<Penetrants>

The ink preferably includes, as a penetrant, at least one of polyol compounds or glycol ether compounds, which have 8 to 11 carbon atoms. Among these compounds, compound having a water solubility of from 0.2% to 5.0% by weight at 25° C. are preferable. Particularly, 2-ethyl-1,3-hexanediol (solubility of 4.2% by weight at 25° C.), and 2,2,4-trimethyl-1,3-pentanediol (solubility of 2.0% by weight at 25° C.) are preferable.

Specific examples of other polyol compounds include aliphatic diols such as 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, and 5-hexene-1,2-diol.

Other penetrants can be used in combination with the above-mentioned penetrants as long as the penetrants can be dissolved in the ink, and the properties of the ink can be controlled so as to fall in the desired ranges. Specific examples thereof include alkyl or aryl ethers of polyalcohols such as diethylene glycol monophenyl ether, ethylene glycol monophenyl ether, ethylene glycol monoallyl ether, diethylene glycol monobutyl ether, propylene glycol monobutyl ether, and tetraethylene glycol chlorophenyl ether; and lower alcohols such as ethanol.

The ink preferably includes the penetrant in an amount of from 0.1 to 4.0% by weight.

The ink including the penetrant in an amount of from 0.1 to 4.0% by weight has good permeability to media and buries dot well.

<Surfactant>

Surfactants having low surface tension and high permeability and leveling property without impairing dispersion stability can be used according to colorants mentioned later or combinations of wetters.

At least one of surfactants selected from nonionic surfactants, anionic surfactants, silicone surfactants and fluorine-containing surfactants is preferably used. Among these, the silicone surfactants and the fluorine-containing surfactants are preferably used.

These surfactants can be used alone or in combination.

Specific examples of the nonionic surfactants include polyoxyethylene alkyl ethers such as polyoxyethylene lauryl ether, polyoxyethylene myristyl ether, polyoxyethylene cetyl ether, polyoxyethylene stearyl ether, and polyoxyethylene oleyl ether; polyoxyethylene alkylphenyl ethers such as polyoxyethylene ocrylphenyl ether, and polyoxyethylene nonylphenyl ether; polyoxyethylene α-naphthyl ether, polyoxyethylene β-naphthyl ether, polyoxyethylene monostyrylphenyl ether, polyoxyethylene distyrylphenyl ether, polyoxyethylene alkylnaphthyl ether, polyoxyethylene monostyrylnaphthyl ether, polyoxyethylene distyrylnaphthyl ether, and polyoxyethylene-polyoxypropylene block copolymers.

In addition, surfactants in which part of the polyoxyethylene group of these surfactants is replaced with a polyoxypropylene group; and surfactants prepared by subjecting surfactants having an aromatic ring such as polyoxyethylene alkylphenyl ether to condensation using formalin can also be used.

Among nonionic surfactants, nonionic surfactants having a HLB of from 12 to 19.5, and preferably from 13 to 19 are preferable.

Specific examples of the anionic surfactants include polyoxyethylene alkyl ether sulfuric acid salts, polyoxyethylene alkylphenyl ether sulfuric acid salts, polyoxyethylene monostyrylphenyl ether sulfuric acid salts, polyoxyethylene distyrylphenyl ether sulfuric acid salts, polyoxyethylene alkyl ether phosphoric acid salts, polyoxyethylene alkylphenyl ether phosphoric acid salts, polyoxyethylene monostyrylphenyl ether phosphoric acid salts, polyoxyethylene distyrylphenyl ether phosphoric acid salts, polyoxyethylene alkyl ether carboxylic acid salts, polyoxyethylene alkylphenyl ether carboxylic acid salts, polyoxyethylene monostyrylphenyl ether carboxylic acid salts, polyoxyethylene distyrylphenyl ether carboxylic acid salts, formalin condensation products of naphthalene sulfonic acid salts, formalin condensation products of melamine sulfonic acid salts, salts of dialkyl sulfosuccinic acid esters, di-salts of alkyl sulfosuccinate, di-salts of polyoxyethylene alkylsulfosuccinate, alkyl sulfoacetic acid salts, α-olefin sulfonic acid salts, alkylbenzene sulfonic acid salts, alkylnaphthalene sulfonic acid salts, alkylsulfonic acid salts, N-acylamino acid salts, acylated peptides, and soaps.

Among these anionic surfactants, sulfates or phosphates of polyoxyethylene alkyl ethers, polyoxyethylen alkylphenyl ethers, and polyoxyethylene distyrylphenyl ether are particularly preferable.

Among the fluorine-containing surfactants, surfactants in which the number of carbon atoms connected with a fluorine atom is from 2 to 16, and preferably from 4 to 16, are preferable. When 2 to 16, the surfactant has high capability of lowering surface tension and good preservability.

Suitable materials for use as the fluorine-containing surfactant include perfluoroalkylsulfonic acid compounds, perfluoroalkylcarboxylic acid compounds, perfluoroalkylphospholic acid ester compounds, perfluoroalkylethylene oxide adducts, and polyoxyalkylene ether polymer compounds having a perfluoroalkyl ether group in a side chain thereof. Among these compounds, polyoxyalkylene ether polymer compounds having a perfluoroalkyl ether group in a side chain thereof are preferable because of having small foaming ability.

In particular, fluorine-containing surfactants having the following formula are preferable.

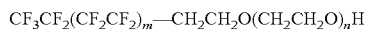

wherein each of m represents 0 or an integer of from 1 to 10 and n represents 0 or an integer of from 1 to 40.

Specific examples of the perfluoroalkylsulfonic acid compounds include perfluoroalkylsulfonic acids, and perfluoroalkylsulfonic acid salts.

Specific examples of the perfluoroalkylcarboxylic acid compounds include perfluoroalkylcarboxylic acids, and perfluoroalkylcarboxylic acid salts.

Specific examples of the perfluoroalkylphospholic acid ester compounds include perfluoroalkylphospholic acid esters, and salts of perfluoroalkylphospholic acid esters.

Specific examples of the polyoxyalkylene ether polymer compounds having a perfluoroalkyl ether group in a side chain thereof include polyoxyalkylene ether polymers, salts of polyoxyalkylene ether polymers, and sulfuric acid esters of polyoxyalkylene ether polymers, which have a perfluoroalkyl ether group in a side chain thereof.

Specific examples of the counter ion of such fluorine containing surfactants include Li, Na, K, $NH_4$, $NH_3CH_2CH_2OH$, $NH_2(CH_2CH_2OH)_2$, and $NH(CH_2CH_2OH)_3$.

Fluorine-containing compounds having one of the following formulae (2) to (7) are preferably used.

(1) Anionic Fluorine-Containing Surfactants

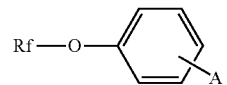 (2)

In formula (2), Rf represent a group having the following formula (A) or (B).

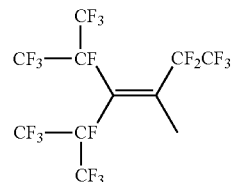 (A)

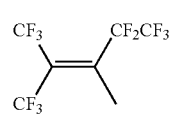 (B)

In formula (2), A represents a group having one of the following formulae.
—$SO_3X$, —COOX, and —$PO_3X$,
wherein X represents a counter anion such as H, Li, Na, K, $NH_4$, $NH_3CH_2CH_2OH$, $NH_2(CH_2CH_2OH)_2$, and $NH(CH_2CH_2OH)_3$.

$(RfO)_nPO(OX)_m$ (3)

In formula (3), X is defined above in formula (2), n is 1 or 2, m is an integer of 2-n, and Rf' represents a group having the following formula (C).

$F(CF_2CF_2)_nCH_2CH_2$— (C)

wherein n is an integer of from 3 to 10.

$Rf'SCH_2CH_2COOX$ (4)

In formula (4), X is defined above in formula (2), and Rf' is defined above in formula (3).

$Rf'SO_3X$ (5)

In formula (5), X is defined above in formula (2), and Rf' is defined above in formula (3).

(2) Nonionic Fluorine-Containing Surfactants $RfO(CH_2CH_2O)_nH$ (6)

wherein Rf is defined above in formula (2), and n is an integer of from 5 to 20.

$Rf'O(CH_2CH_2O)_nH$ (7)

wherein Rf' is defined above in formula (3), and n represents an integer of from 1 to 40.

Synthesized or marketed fluorine-containing surfactants can be used.

Specific examples of such marketed fluorine-containing surfactants include SARFRONs S-111, S-112, S-113, S-121, S-131, S-132, S-141 and S-145, which are manufactured by Asahi Glass Co.; Ltd.; FLUORADs FC-93, FC-95, FC-98, FC-129, FC-135, FC-170C, FC-430 and FC-431, which are manufactured by Sumitomo 3M Ltd.; MEGAFACEs F-470, F-1405 and F-474, which are manufactured by DIC Corp.; ZONYLs TBS, FSP, FSA, FSN-100, FSN, FSO-100, FSO, FS-300 and UR, which are manufactured by Du Pont;

FT-110, FT-250, FT-251, FT-400S, FT-150 and FT-400SW, which are manufactured by Neos Co., Ltd.; and POLYFOX PF-151N, which is manufactured by Om Nova Solutions, Inc. Among these products, FS-300 (Du Pont); FT-110, FT-250, FT-251, FT-400S, FT-150, and FT-400SW (Neos Co., Ltd.); and POLYFOX PF-151N (Om Nova Solutions, Inc.) are preferable because images formed by the ink have good image qualities, particularly, recorded images have good coloring property, and good color evenness on recording papers.

As the silicone surfactant, polyether-modified silicone surfactants are preferably used.

The polyether-modified silicone surfactants are not particularly limited. For example, compounds in which a polyalkyleneoxide structure is incorporated into a side chain connected with a Si atom of a dimethylpolysiloxane chain and which have the following formula (8) can be used.

$$H_3C-\underset{\underset{CH_3}{|}}{\overset{\overset{CH_3}{|}}{Si}}-O-\left[\underset{\underset{CH_3}{|}}{\overset{\overset{CH_3}{|}}{Si}}-O\right]_m\left[\underset{\underset{X}{|}}{\overset{\overset{CH_3}{|}}{Si}}-O\right]_n\underset{\underset{CH_3}{|}}{\overset{\overset{CH_3}{|}}{Si}}-CH_3 \quad (8)$$

$$X=-R(C_2H_4O)_a(C_3H_6O)_bR'$$

wherein each of m, n, a and b is independently an integer, and R and R' respectively represents an alkylene group and an alkyl group.

Specific examples of the polyether-modified silicone-containing surface active agents include, but are not limited to, KF-618, KF-642, and KF-643 (manufactured by Shin-Etsu Chemical Co., Ltd.).

The added amount of such a surfactant is preferably from 10 to 50% by weight based on the weight of the pigment included in the ink.

The content of such a surfactant in the ink is preferably from 0.01 to 3% by weight, and more preferably from 0.5 to 2% by weight, based on the total weight of the ink.

<pH Regulators>

The pH regulator is added so that the ink has an alkaline pH. In this case, the ink is stable as a dispersion, and can be ejected stably from an inkjet recording head. When the pH of the ink is not less than 11, the ink tends to easily dissolve recording heads and ink supplying units depending on the materials constituting the heads and units, thereby causing problems such that the properties of the ink are changed; the ink is leaked from the recording heads and the ink supplying units; and the ink is defectively ejected from the recording heads.

When a pigment is used as the colorant of the ink, it is relatively preferable to add a pH regulator in combination with a dispersant when the pigment is dispersed in water compared to a case in which after the pigment is dispersed, a pH regulator is added thereto in combination with additives such as wetting agents, and penetrants. This is because there is a case in which the pH regulator agglomerates the pigment dispersion depending on the property of the pH regulator.

Suitable materials for use as the pH regulator include alcohol amines, hydroxides of alkali metals, ammonium hydroxides, phosphonium hydroxides, and carbonates of alkali metals. These compounds can be used alone or in combination.

Specific examples of the alcohol amines include diethanolamine, triethanolamine, and 2-amino-2-ethyl-1,3-propanediol. Specific examples of the hydroxides of alkali metals include lithium hydroxide, sodium hydroxide, and potassium hydroxide. Specific examples of the ammonium hydroxides include ammonium hydroxide, and quaternary ammonium hydroxide. Specific examples of the phosphonium hydroxides include quaternary phosphonium hydroxide. Specific examples of the carbonates of alkali metals include lithium carbonate, sodium carbonate, and potassium carbonate.

<Antiseptics/Fungicides>

Specific examples of the antiseptics/fungicides include sodium dehydroacetate, sodium sorbate, sodium salt of 2-pilidinethiol-1-oxide, sodium benzoate, and sodium salt of pentachlorophenol.

<Antirusts>

Specific examples of the antirusts include acidic sulfites, sodium thiosulfate, ammonium thioglycolate, diisopropylammonium nitrite, pentaerythritol tetranitrate, and dicyclohexylammonium nitrite.

<Chelate Reagents>

Specific examples of the chelating agents include sodium salt of ethylenediamine tetraacetic acid, sodium salt of nitrilotriacetic acid, sodium salt of hydroxyethylethylenediaminetriacetic acid, sodium salt of diethylenetriaminepentaacetic acid, and sodium salt of uramildiacetic acid.

<Dyes>

Suitable materials for use as the dye serving as a colorant in the ink include dyes which fall in the categories of acidic dyes, direct dyes, basic dyes, reactive dyes, and food dyes in Color Index and which have a good combination of water resistance and light resistance. These dyes can be used in combination. In addition, the dyes can be used in combination of another colorant such as pigments. In this regard, such a colorant as used in combination with the dyes is added in an amount such that the effect of the ink is not deteriorated thereby.

Specific examples of the dyes include the following dyes (a) to (d).

(a) Acidic Dyes and Food Dyes

C.I. Acid Yellows 17, 23, 42, 44, 79 and 142.
C.I. Acid Reds 1, 8, 13, 14, 18, 26, 27, 35, 37, 42, 52, 82, 87, 89, 92, 97, 106, 111, 114, 115, 134, 186, 249, 254 and 289.
C.I. Acid Blues 9, 29, 45, 92 and 249.
C.I. Acid Blacks 1, 2, 7, 24, 26 and 94.
C.I. Food Yellows 3 and 4.
C.I. Food Reds 7, 9 and 14.
C.I. Food Black 1 and 2.

(b) Direct Dyes

C.I. Direct Yellows 1, 12, 24, 26, 33, 44, 50, 86, 120, 132, 142 and 144.
C.I. Direct Reds 1, 4, 9, 13, 17, 20, 28, 31, 39, 80, 81, 83, 89, 225 and 227.
C.I. Direct Oranges 26, 29, 62 and 102.
C.I. Direct Blues 1, 2, 6, 15, 22, 25, 71, 76, 79, 86, 87, 90, 98, 163, 165, 199 and 202.
C.I. Direct Blacks 19, 22, 32, 38, 51, 56, 71, 74, 75, 77, 154, 168 and 171.

(c) Basic Dyes

C.I. Basic Yellows 1, 2, 11, 13, 14, 15, 19, 21, 23, 24, 25, 28, 29, 32, 36, 40, 41, 45, 49, 51, 53, 63, 64, 65, 67, 70, 73, 77, 87 and 91.
C.I. Basic Reds 2, 12, 13, 14, 15, 18, 22, 23, 24, 27, 29, 35, 36, 38, 39, 46, 49, 51, 52, 54, 59, 68, 69, 70, 73, 78, 82, 102, 104, 109 and 112.
C.I. Basic Blues 1, 3, 5, 7, 9, 21, 22, 26, 35, 41, 45, 47, 54, 62, 65, 66, 67, 69, 75, 77, 78, 89, 92, 93, 105, 117, 120, 122, 124, 129; 137, 141, 147 and 155.
C.I. Basic Blacks 2 and 8.

(d) Reactive Dyes

C.I. Reactive blacks 3, 4, 7, II, 12 and 17.

C.I. Reactive Yellows 1, 5, 11, 13, 14, 20, 21, 22, 25, 40, 47, 51, 55, 65 and 67.

C.I. Reactive Reds 1, 14, 17, 25, 26, 32, 37, 44, 46, 55, 60, 66, 74, 79, 96 and 97.

C.I. Reactive Blues 1, 2, 7, 14, 15, 23, 32, 35, 38, 41, 63, 80 and 95.

Next, solid materials which are not included in the hydro-soluble organic materials are explained.

<Pigment>

Suitable materials for use as the pigments include organic pigments such as azo pigments, phthalocyanine pigments, anthraquinone pigments, dioxazine pigments, indigo pigments, thioindigo pigments, perylene pigments, isoindolinone pigments, aniline black, azomethine pigments, and Rhodamine B Lake pigments; and inorganic pigments such as carbon black, iron oxide, titanium oxide, calcium carbonate, barium sulfate, aluminum hydroxide, barium yellow, Prussian blue, cadmium red, chrome yellow, and metal powders.

Specific examples of black color pigments include carbon blacks (i.e., C.I. Pigment Black 7) such as furnace black, lamp black, acetylene black, and channel black; powders of metal oxides such as copper oxide, iron oxide (i.e., C.I. Pigment Black 11), and titanium oxide; and organic pigments such as Aniline Black (i.e., C.I. Pigment Black 1).

Specific examples of yellow color pigments include C.I. Pigment Yellows 1 (Fast Yellow G), 2, 3, 12 (Disazo yellow AAA), 13, 14, 16, 17, 20, 23, 24, 34, 35, 37, 42, (yellow iron oxide), 53, 55, 73, 74, 75, 81, 83 (Disazo yellow HR), 86, 93, 95, 97, 98, 100, 101, 104, 108, 109, 110, 114, 117, 120, 125, 128, 129, 137, 138, 139, 147, 148, 150, 151, 153, 154, 155, 166, 168, 180 and 185.

Specific examples of magenta color pigments include C.I. Pigment Violet 19; and C.I. Pigment Reds 1, 2, 3, 5, 7, 9, 12, 17, 22 (Brilliant Fast Scarlet), 23, 31, 38, 48:1 (Permanent Red 2B(Ba)), 48:2 (Permanent Red 2B(Ca)), 48:3 (Permanent Red 2B(Sr)), 48:4 (Permanent Red 2B(Mn)), 49:1, 52:2, 53:1, 57:1 (Brilliant Carmine 6B), 60:1, 63:1, 63:2, 64:1, 81 (Rhodamine 60 Lake), 83, 88, 92, 97, 101 (red iron oxide), 104, 105, 106, 108 (cadmium red), 112, 114, 122 (dimethyl quinacridone), 123, 146, 149, 166, 168, 170, 172, 175, 176, 178, 179, 180, 184, 185, 190, 192, 193, 202, 209, 215, 216, 217, 219, 220, 223, 226, 227, 228, 238, 240, 254, 255 and 272.

Specific examples of eyan color pigments include C.I. Pigment Blues 1, 2, 3, 15 (copper Phthalocyanine Blue R), 15:1, 15:2, 15:3 (Phthalocyanine Blue G), 15:4, 15:6 (Phthalocyanine Blue E), 16, 17:1, 22, 56, 60, 63 and 64, and Vat Blues 4 and 60.

Specific examples of intermediate color pigments (such as red, green and blue pigments) include C.I. Pigment Reds 177, 194 and 224, C.I. Pigment Oranges 16, 36, 43, 51, 55, 59, 61 and 71, C.I. Pigment Violets 3, 19, 23, 29, 30, 37, 40 and 50, and C.I. Pigment Greens 7 and 36.

Among the above-mentioned black pigments, carbon blacks are preferable. Among carbon blacks, furnace and channel carbon blacks having a primary particle diameter of from 15 to 40 nm, a BET specific surface area of from 50 to 300 m$^2$/g, a DBP (dibutyl phthalate) oil absorption of from 40 to 150 ml/100 g, a volatile content of from 0.5 to 10% by weight, and a pH of from 2 to 9 are preferable. Acidic carbon blacks having a pH of not greater than 6 are more preferable because of producing high density images.

Among the above-mentioned color pigments, Pigment Yellows 13, 17, 55, 74, 93, 97, 98, 110, 128, 139, 147, 150, 151, 154, 155, 180 and 185, Pigment reds 122, 202 and 209, Pigment Violet 19, and Pigment Blues 15:3 and 15:4 are preferable.

The volume average particle diameter of the pigment to be included in the ink preferably from 20 to 200 nm, more preferably from 30 to 150 nm, and even more preferably from 50 to 100 nm.

The volume average particle diameter (D50) of a pigment is measured with an instrument, MICRO TRACK UPA-150 from Nikkiso Co., Ltd. When measuring the volume average particle diameter (i.e., a 50% average particle diameter D50) of a pigment, the pigment is dispersed in pure water at a concentration of 0.01% by weight, and the measurements are performed under the following conditions.

Refractive index of particle: 1.51

Density of particle: 1.4 g/cm$^3$

Solvent parameter: Pure water parameter

Temperature: 23° C.

The ink preferably includes a resin emulsion to enhance the rub resistance of ink images and to enhance the preservation stability of the ink when a pigment is used as the colorant. In order to enhance the rub resistance, emulsions of acrylic resin, styrene-acrylic resins, acrylic-silicone resins, and fluorine-containing resins are preferably used. In order to enhance the preservation stability, emulsions of polyurethane, acrylic resins, and styrene-acrylic resins are preferably used. Since it is hard to impart a good combination of rub resistance and preservation stability to the ink using one resin emulsion, it is possible to use two or more kinds of resin emulsions. Marketed products of such resin emulsions can be used while properly selected.

Typical examples of such resin emulsions are as follows.

(1) Urethane Resin Emulsions

Urethane resins of urethane resin emulsions are prepared by polymerizing a polyisocyanate and a polyol such as polyether polyol, polyester polyol, polylactone polyol and polycarbonate polyol. Specific examples of the polyisocyanate include aliphatic diisocyanate compounds such as hexamethylene diisocyanate, and 2,2,4-trimethylhexamethylene diisocyanate; alicyclic diisocyanate compounds such as isophorone diisocyanate, hydrogenated xylylene diisocyanate, 1,4-cyclohexane diisocyanate, and 4,4'-dicyclohexylmethane diisocyanate; aromatic diisocyanate such as xylylene diisocyanate, tetramethylxylene diisocyanate, tolylene diisocyanate, and phenylmethane diisocyanate; and modified compounds of such diisocyanate compounds (such as carbodiimide-, urethodione- or urethoimine-modified compounds).

Specific examples of the polyether polyols include polyethylene glycol, polypropylene glycol, polytetramethylene ether glycol, and polyhexamethylene ether glycol.

Specific examples of the polyester polyols include polyethylene adipate, polybutylene adipate, polyneopentyl adipate, poly-3-methylpentyl adipate, polyethylene/butylene adipate, and polyneopentyl/hexyl adipate.

Specific examples of the polylactone polyols include polycaprolactone diol, and polyomegahydroxycaproic acid polyol.

Specific examples of the polycarbonate polyols include reaction products obtained by reacting a diol such as 3-propanediol, 1,4-butanediol, 1,6-hexanediol, diethylene glycol, triethylene glycol, and tetraethylene glycol, phosgene, and diaryl carbonate (such as diphenyl carbonate) or a cyclic carbonate (such as ethylene carbonate and propylene carbonate).

(2) Acrylic Resin Emulsions

Acrylic resins of acrylic resin emulsions are prepared by polymerizing an acrylic monomer alone or copolymerizing an acrylic monomer with another monomer.

Specific examples of the acrylic monomer include methyl acrylate, ethyl acrylate, n-propyl acrylate, isopropyl acrylate, n-butyl acrylate, isobutyl acrylate, t-butyl acrylate, n-pentyl acrylate, isopentyl acrylate, neopentyl acrylate, 3-(methyl) butyl acrylate, hexyl acrylate, 2-ethylhexyl acrylate, cyclohexyl acrylate, octyl acrylate, nonyl acrylate, decyl acrylate, undecyl acrylate, dodecyl acrylate, phenyl acrylate, methyl methacrylate, n-propyl methacrylate, isopropyl methacrylate, n-butyl methacrylate, isobutyl methacrylate, t-butyl methacrylate, 3-(methyl)butyl methacrylate, hexyl methacrylate, 2-ethylhexyl methacrylate, octyl methacrylate, nonyl methacrylate, decyl methacrylate, undecyl methacrylate, dodecyl methacrylate, acrylic acid, methacrylic acid, acrylamide, methacrylamide, acrylonitrile, and methacrylonitrile.

Specific examples of other monomers include vinyl-type aromatic hydrocarbons such as styrene, o-methylstyrene, m-methylstyrene, p-methylstyrene, α-methylstyrene, p-ethylstyrene, 2,4-dimethylstyrene, p-tert-butylstyrene, p-chlorostyrene and divinylbenzene; unsaturated carboxylic acids such as itaconic acid, and maleic acid; N-substituted maleimide, maleic anhydride, vinyl ketone, vinyl acetate, and vinylidene chloride.

By incorporating an ionic group into the resin of such a resin emulsion, the resin can be dispersed in water more satisfactorily. Specific examples of such an ionic group include a sulfonic acid group, a carboxylic acid group, a sulfuric acid group, a phosphoric acid group, a phosphonic acid group, a phosphine acid group, and alkali metal salts, alkali earth metal salts, ammonium salts, and primary to tertiary amine salts of these acid groups. Among these ionic groups, alkali metal salts of carboxylic acids, ammonium salts of carboxylic acids, alkali metal salts of sulfonic acids, and ammonium salts of sulfonic acids are preferable, and alkali metal salts of sulfonic acids, and ammonium salts of sulfonic acids are particularly preferable because the resultant resin emulsion can be stably dispersed in water. An ionic group is typically incorporated by using a monomer having an ionic group when synthesizing a resin. Among the salts, Li, K and Na salts are preferable.

<Water>

Specific examples of the water include pure water such as ion-exchanged water, ultra-filtrated water, Milli-Q water and distilled water; or ultrapure water.

The ink can be prepared by a known method. For example, ink components such as a colorant, a wetting agent, a surfactant, and water, and other optional components such as a penetrant, an aqueous resin dispersion, and other components are subjected to dispersing/dissolving while agitated if desired. The dispersing treatment is performed using a mixer such as a sand mill, a homogenizer, a ball mill, a paint shaker, and a supersonic dispersing machine, and the agitation is performed by an agitator having an agitating blade, a magnetic stirrer, and a high speed dispersing machine.

The property of the ink is not particularly limited, and is properly determined so that the ink can be satisfactorily used for the target image forming apparatuses.

However, the ink preferably has a viscosity of from 5 to 15 mPa·s at 25° C. When the ink has a viscosity of not less than 5 mPa·s, effects to improve image density and character image quality can be produced. In addition, when the ink has a viscosity of not greater than 15 mPa·s, the ink has good ejection stability.

In this regard, the viscosity is measured at 25° C. using a viscometer such as RL-500 from Toki Sangyo Co., Ltd.

The ink preferably has a surface tension of not greater than 35 mN/m at 25° C., and more preferably not greater than 32 mN/m. When the surface tension is not greater than 35 mN/m, the ink leveling on recording media is improved.

The color of the ink is not particularly limited, and is properly determined depending on the purpose of the ink. For example, yellow, magenta, cyan and black color inks are used. By using an ink set including two or more of these color inks, multi-color images can be formed. By using an ink set including these four color inks, full color images can be formed. The ink can be used for any inkjet printers having an inkjet recording head. Specific examples of such printers include the following:

(1) Piezoelectric inkjet printers (such as a printer disclosed by JP-H02-51734-A), in which a piezoelectric device is used as a pressure generating device to press an ink in an ink passage, and a vibrating plate forming a wall of the ink passage is deformed by the piezoelectric device to change the volume of the ink passage to eject ink droplets from the ink passage, thereby forming an ink image on a recording medium;

(2) Thermal inkjet printers (such as a printer disclosed by JP-S61-59911-A), in which an ink in an ink passage is heated by heating a resistor to form an air bubble in the ink passage, thereby ejecting ink droplets from the ink passage, resulting in formation of an ink image on a recording medium; and (3) Electrostatic inkjet printers (such as a printer disclosed by JP-H06-71882-A), in which an electrostatic force is formed between a vibrating plate and an electrode opposed to the vibrating plate to deform the vibrating plate and to change the volume of the ink passage, thereby ejecting ink droplets from the ink passage, resulting in formation of an ink image on a recording medium.

The ink of this disclosure can be used as inkjet ink, ink for fountain pens, ballpoint pens, magic markers, and marking pens, and is particularly preferably used for image forming apparatuses (such as printers) using an inkjet recording method. For example, the ink can be used for a printer in which a recording medium and an ink are heated to a temperature of from 50 to 200° C. before or after an image is formed to fix the image, or the image forming apparatus of this disclosure. In addition, the ink can also be preferably used for forming a print of this disclosure.

<Recording Medium>

Plain papers having no coated layer are preferably used as the recording medium. Specifically, plain papers for use as copy papers, which have a sizing degree of not less than 10 seconds, and an air permeability of from 5 to 50 seconds, are preferable.

<Ink Cartridge>

The ink cartridge of this disclosure includes a container n which the ink of this disclosure is contained, and optionally includes other members.

The container is not particularly limited, and the shape, structure, dimension and constitutional materials of the container are properly determined depending on the purpose of the ink cartridge. For example, ink bags made of an aluminum-laminated film, or a resin film can be preferably used.

Figure 2:
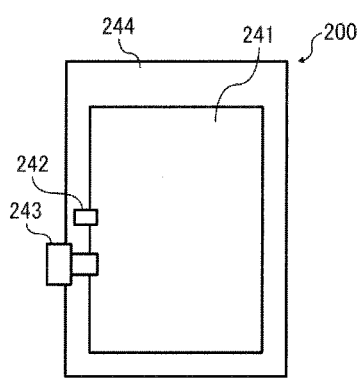
FIG. 2 is a schematic view illustrating the ink cartridge including the ink bag in a cartridge case.

The ink cartridge will be described by reference to FIGS. 1 and 2. FIG. 1 is a schematic view illustrating an ink cartridge according to an embodiment, and FIG. 2 is a schematic view illustrating a modified version of the ink cartridge illustrated in FIG. 1.

As illustrated in FIG. 1, the ink of this disclosure is fed into an ink bag 241 (serving as a container) of an ink cartridge 201 from an ink inlet 242. After discharging air from the ink bag 241, the ink inlet 242 is closed by welding or the like. When the ink cartridge 201 is used, the ink cartridge 201 is set in an inkjet printer 101 (illustrated in FIG. 3) so that a needle of the inkjet printer is inserted into an ink outlet 243 of the ink cartridge 201, and therefore the ink in the ink bag 241 is supplied to a main body of the printer 101. The ink bag 241 is typically made of a material having low permeability to gas such as wrapping materials (e.g., aluminum-laminated films). The ink bag 241 is contained in a cartridge case 244 (illustrated in FIG. 2) typically made of a plastic. The resultant ink cartridge 201 is typically used by being detachably attached to an image forming apparatus, preferably the inkjet recording apparatus of this disclosure mentioned later.

<Image Forming Methods>

When an image is formed using the ink of this disclosure, an ink ejecting process is performed in which stimulus (energy) is applied to the ink in an inkjet recording head so that the ink is ejected from the recording head toward a recoding medium to form the image on the recording medium. In this regard, in order to form images having a high image density without image blurring, and soiling of the backside of the recording medium, a pretreatment liquid applying process m which a pretreatment liquid is applied to the recording medium before the ink ejecting process, and/or an aftertreatment liquid applying process in which a aftertreatment liquid is applied to the recording medium after the ink ejecting process can be performed.

In the ink ejecting process, stimulus (energy) is applied to the ink to eject the ink, so that the ejected ink flies and is adhered to a surface of a recording medium, thereby forming an ink image on the recording medium.

The ink ejecting device (i.e., inkjet recording head) applies stimulus (energy) to the ink to eject the ink toward a recording medium, thereby forming an ink image on the recording medium. The ink ejecting device is not particularly limited, and for example, inkjet nozzles can be used as the ink ejecting device.

In the ink ejecting device of the inkjet recording apparatus of this disclosure, at least part of the liquid chamber, the fluid resistant portion, the vibrating plate and the nozzles is preferably made of a material including at least one of silicon or nickel.

In addition, the nozzles preferably have a diameter of not greater than 30 μm, and more preferably from 1 μm to 20 μm.

The above-mentioned stimulus (energy) is generated by a stimulus generator. The stimulus is not particularly limited, and is determined depending on the purpose of the ink ejecting device. For example, heat (temperature), pressure, vibration and light can be used as the stimulus. These can be used alone or in combination. Among these, heat and pressure are preferable.

Suitable devices for use as the stimulus generator include heaters, pressing devices, piezoelectric devices, vibration generators, ultrasonic oscillators, and lights. Specific examples thereof include, but are not limited thereto, piezoelectric actuators (e.g., piezoelectric devices), thermal actuators to eject ink droplets utilizing phase change of ink by boiling a liquid film using an electrothermal device such as a resistor, shape memory alloy actuators utilizing phase change of metal caused by temperature change, and electrostatic actuators utilizing electrostatic force.

The manner of ink ejection is not particularly limited, and changes depending on the stimulus applied. For example, when the stimulus is heat, a method in which heat energy is applied to the ink in an inkjet recording head according to image information signals using a thermal head or the like to form a bubble in the ink, thereby ejecting the ink in the recording head from a nozzle by the pressure of the bubble can be used. When the stimulus is pressure, a method in which a voltage is applied to a piezoelectric element adhered to a pressure chamber present in an ink flow path in an inkjet recording head to bend the piezoelectric element, thereby decreasing the volume of the pressure chamber, resulting in ejection of the inkjet ink from a nozzle of the recording head can be used.

The volume of an inkjet ink droplet ejected from a nozzle is generally from $3 \times 10^{-15}$ to $40 \times 10^{-15}$ m$^3$ (i.e., 3 to 40 pl). The speed of an ejected ink droplet is generally from 5 to 20 m/s. The drive frequency is generally not less than 1 kHz. The resolution of images recorded by ejected ink droplets is generally not less than 300 dpi (dots per inch).

The above-mentioned stimulus generators are controlled by a controller. The controller is not particularly limited, and for example, a device such as sequencers and computers is used.

Next, the inkjet recording apparatus of this disclosure will be described by reference to a serial inkjet recording apparatus.

Figure 3:
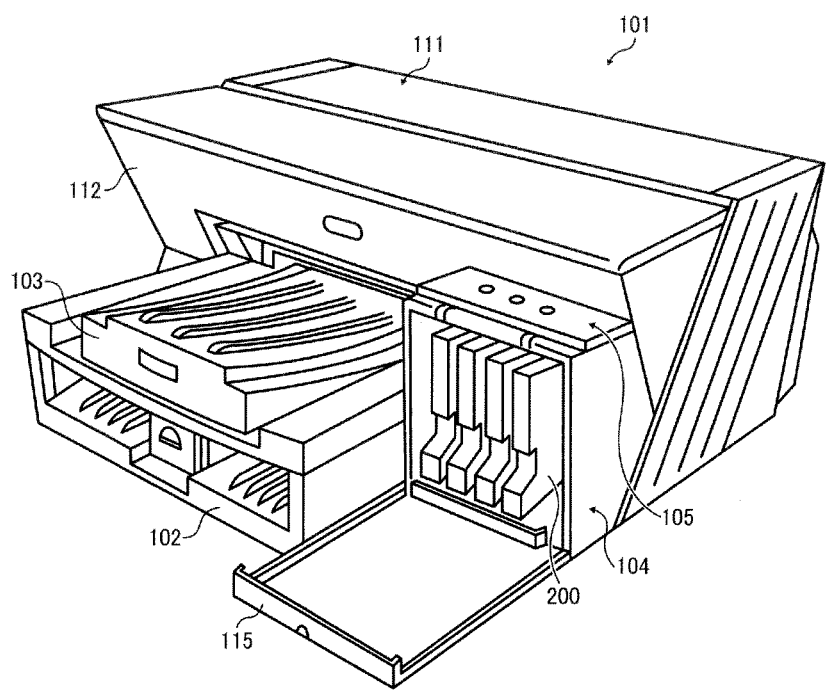
FIG. 3 is a perspective view illustrating an embodiment of the inkjet recorder of the present invention with a cover of the ink cartridge loading part open.

FIG. 3 is a schematic perspective view illustrating a serial inkjet recording apparatus as an inkjet recording apparatus according to an embodiment.

The inkjet recording apparatus illustrated in FIG. 3 includes a main body 101 thereof, a recording sheet feed tray 102, which is attached to the main body 101 and on which a stack of recording sheets is set, a copy tray 103, which is attached to the main body 101 and on which recording sheets bearing ink images thereon are stacked, and an ink cartridge setting portion 104 to which ink cartridges 201 are detachably attached. On the upper surface of the ink cartridge setting portion 104, an operating portion 105 including operation keys, a display, etc. is arranged. The ink cartridge setting portion 104 has a front cover 115 which is openable and closable so that the ink cartridges 201 can be attached to the ink cartridge setting portion 104 or detached therefrom. Numerals 111 and 112 respectively denote an upper cover of the inkjet recording apparatus, and a front cover of the apparatus.

Figure 4:
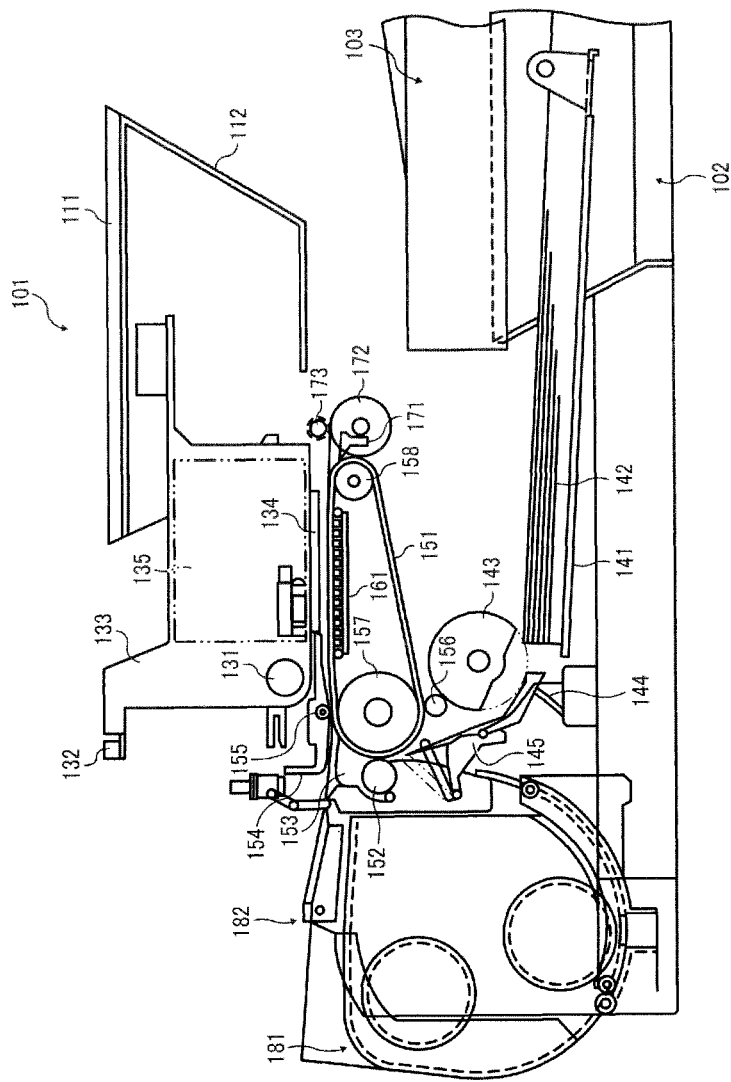
FIG. 4 is a schematic view illustrating an overall structure of the inkjet recorder.
Figure 5:
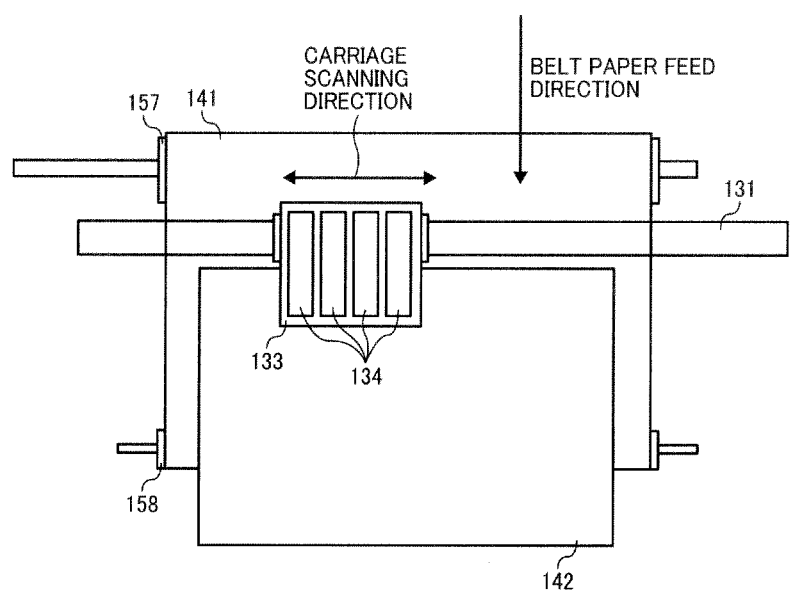
FIG. 5 is an enlarged view illustrating an example of an inkjet head of the inkjet recorder.

As illustrated in FIGS. 4 and 5, a carriage 133 is slidably supported by a guide rod 131 and a stay 132, which are supported by both side plates (not shown) of the main body 101, so that the carriage 133 is moved in a main scanning direction (A) by a math scanning motor (not shown) to perform a scanning operation (i.e., an image forming operation).

An inkjet recording head 134 including four inkjet recording heads, each of which has multiple nozzles arranged in a direction perpendicular to the main scanning direction (A) to eject droplets of yellow (Y), magenta (M), cyan (C) or black (K) inkjet ink downward, is provided on the carriage 133.

Each of the four inkjet recording heads 134 includes an energy generator to eject ink droplets. Specific examples of the energy generator include, but are not limited thereto, piezoelectric actuators (e.g., piezoelectric devices), thermal actuators to eject ink droplets utilizing phase change of ink by boiling a liquid film using an electrothermal device such as a resistor, shape memory alloy actuators utilizing phase change of metal caused by temperature change, and electrostatic actuators utilizing electrostatic force.

In addition, sub-tanks 135 containing the color inkjet inks to supply the color inkjet inks to the respective recording heads 134 are provided on the carriage 133. The color inkjet inks in the ink cartridges 201 set to the ink cartridge setting portion 104 are supplied to the respective sub-tanks 135 via respective ink supplying tubes (not shown).

The inkjet recording apparatus includes a recording sheet supplier to feed recording sheets 142 set on a sheet loading portion (pressing plate) 141. The recording sheet supplier includes a sheet feeding roller 143 to feed the recording sheets 142, and a separation pad 144, which faces the sheet feeding roller 143 while being biased toward the sheet feeding roller 143 and which is made of a material having a high friction coefficient, to feed the recording sheets 142 one by one from the sheet loading portion 141.

The inkjet recording apparatus further includes a feeder to feed the recording sheet 142, which is fed from the recording sheet supplier, toward the image recording area located below the inkjet recording head 134. The feeder includes a feeding belt 151 to feed the recording sheet 142 while electrostatically attracting the recording sheet, a counter roller 152 to feed the recording sheet 142, which is fed from the recording sheet supplier along a guide 145, while sandwiching the recording sheet 142 with the feeding belt 151, a direction changing guide 153 to change the direction of the recording sheet 142, which is fed substantially vertically, at an angle of about 90° so that the recording sheet 142 is contacted with the feeding belt 151 so as to be fed thereby, a pressing roller 155 which is biased toward the feeding belt 151 by a pressing member 154, and a charging roller 156 to charge the surface of the feeding belt 151.

The feeding belt 151 is an endless belt, which is tightly stretched by a feeding roller 157 and a tension roller 158 so as to be rotated in a recording sheet feeding direction (i.e., a sub-scanning direction (B)) perpendicular to the main scanning direction (A). For example, the feeding belt 151 includes a first layer (i.e., an uppermost layer), which electrostatically attracts the recording sheet 142 and which is made of a resin layer (such as a tetrafluoroethylene-ethylene copolymer (ETFE) whose electric resistance is not controlled) with a thickness of about 40 μm, and a second layer (i.e., a medium resistance layer or a grounding layer), which is made of almost the same material as that of the first layer except that carbon black is included therein so that the second layer has a medium electric resistance. In addition, a guide member 161 is arranged below the feeding belt 151 so as to face the image recording area in which an image is recorded on the recording sheet 142 by the inkjet recording head 134. The inkjet recording apparatus further includes a sheet discharger to discharge the recording sheet 142, which bears an image recorded by the inkjet recording head 134, from the main body 101. The sheet discharger includes a separation pick 171 to separate the recording sheet 142 from the feeding belt 151, and discharging rollers 172 and 173 to discharge the recording sheet 142 toward the copy tray 103 located below the discharging roller 172.

A duplex copy unit 181 is detachably attached to the backside of the main body 101 of the inkjet recording apparatus. The duplex copy unit 181 receives the recording sheet 142, which is fed to the duplex copy unit 181 by reversely rotating the feeding belt 151, and feeds again the recording sheet 142 to the nip between the counter roller 152 and the feeding belt 151 so that another image is formed on the backside of the recording sheet 142 by the inkjet recording heads 134 in the image recording area. A manual sheet feeder 182, by which a recording sheet can be manually fed to the inkjet recording apparatus, is provided above the duplex copy unit 181.

The recording sheet 142 is supplied one by one by the recording material supplier. The recording sheet 142 thus fed in substantially the vertical direction is guided by the guide 145 to the nip between the feeding belt 151 and the counter roller 152 so as to be fed by the feeding belt 151 and the counter roller 152. Further, the recording sheet 142 is guided by the direction changing guide 153 so that the direction of the sheet is changed at an angle of about 90°. The recording sheet 142 is then fed by the feeding belt 151 while pressed toward the feeding belt 151 by the pressing roller 155.

In this regard, since the feeding belt 151 is charged by the charging roller 156, the recording sheet 142 is fed by the feeding belt 151 while electrostatically adhered thereto. Next, the carriage 133 is moved in the main scanning direction (A) while the inkjet recording head 134 is driven according to image signals so as to eject droplets of the color inkjet inks to form one line image on the surface of the recording sheet 142, which is stopped in the image forming operation. After recording one line image, the recording sheet 142 is fed in a predetermined length in the sub-scanning direction (B), and the next image forming operation is performed to form another one line image on the surface of the recording material sheet 142. By repeating the image forming operation, an image is formed on the surface of the recording material sheet 142. When the inkjet recording apparatus receives a signal such that the image recording operation is completed or the rear edge of the recording sheet 142 reaches the image recording area, the inkjet recording apparatus stops the image forming operation, and the sheet discharger discharges the recording sheet 142 bearing the image thereon to the copy tray 103.

When it is detected that the inkjet ink in the sub tank 135 is substantially exhausted (i.e., near-end of ink is detected), a predetermined amount of ink is supplied to the sub tank 135 from the corresponding ink cartridge 201.

When the inkjet ink in the ink cartridge 201 is exhausted, it is possible that after the ink cartridge is disassembled, the ink bag in the ink cartridge is replaced with a new ink bag, and then the ink cartridge 201 is assembled again to be attached to the inkjet recording apparatus. Even when the ink cartridge 201 is set so as to be vertical from a front side of the inkjet recording apparatus as illustrated in FIG. 3, the ink in the ink cartridge 201 can be stably supplied to the corresponding sub tank 135. Therefore, even when the ink cartridge cannot be set from the upper side of the main body 101 of the inkjet recording apparatus due to space limitation (for example, in a case where the apparatus is set in a rack or an object is set on the upper surface of the apparatus), the ink cartridge 201 can be easily replaced.

Hereinbefore, the inkjet recording apparatus of this disclosure has been described by reference to a serial (shuttle-type) inkjet recording apparatus in which a carriage is scanned in the main scanning direction (A). However, the inkjet recording apparatus is not limited thereto, and can include a line inkjet recording apparatus using a line-type inkjet recording head.

In addition, the inkjet recording apparatus of this disclosure can be used for image forming apparatuses using an inkjet recording method, such as inkjet recording printers, facsimiles, copiers, and multi-functional products having functions of printer, facsimile and copier.

<Ink Recorded Matter>

The ink of this disclosure can form a print in which an image of the ink is formed on a recording medium serving as a support. The recording medium is not particularly limited. Specific examples of the recording medium include papers such as plain papers, gloss papers, and general-purpose printing papers.

The print of this disclosure has high image quality, and good preservation stability. Therefore, the print can be used for various purposes such as archival documents.

EXAMPLES

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

Pigment Dispersion

Preparation Example 1

Preparation of Dispersion of Surface-Treated Carbon Black

Ninety (90) grams of a carbon black having a CTAB specific surface area of 150 and a DBP oil absorption of 100 ml/100 g was added to 3,000 ml of a 2.5N aqueous solution of sodium sulfate, and the mixture was heated to 60° C. while agitated for 10 hours by an agitator rotated at a speed of 300 rpm to perform a reaction. The reaction product was filtered, and the obtained carbon black was mixed with an aqueous solution of sodium hydroxide to neutralize the carbon black, followed by ultrafiltration. The thus obtained carbon black was washed with water and then dried. The carbon black was dispersed in pure water at a concentration of 30% by weight to prepare a [black pigment dispersion].

Preparation Example 2

Preparation of Dispersion of Surface-Treated Yellow Pigment

A yellow pigment, C.I. Pigment Yellow 128, was subjected to a low-temperature plasma treatment to incorporate a carboxylic acid group into the pigment. The thus prepared yellow pigment was dispersed in ion-exchanged water, and the dispersion was subjected to desalination/condensation using an ultrafiltration membrane to prepare a yellow pigment dispersion having a pigment content of 30% by weight.

Preparation Example 3

Preparation of Dispersion of Surface-Treated Magenta Pigment

The procedure for preparation of the yellow pigment dispersion in Preparation Example 2 was repeated except that the yellow pigment was replaced with a magenta pigment, C.I. Pigment Red 122, to prepare a magenta pigment dispersion having a pigment content of 30% by weight.

Preparation Example 4

Preparation of Dispersion of Surface-Treated Cyan Pigment

The procedure for preparation of the yellow pigment dispersion in Preparation Example 2 was repeated except that the yellow pigment was replaced with a cyan pigment, C.I. Pigment Blue 15:3, to prepare a cyan pigment dispersion having a pigment content of 30% by weight.

Synthesis Example 1

Preparation of Polymer Solution

After air inside a 1-liter flask, which is equipped with a mechanical agitator, a thermometer, a nitrogen gas feed pipe, a reflux tube, and a dropping funnel, was substituted with a nitrogen gas, the following components were fed thereto to prepare a mixture.

| | |
|---|---|
| Styrene | 11.2 g |
| Acrylic acid | 2.8 g |
| Lauryl methacrylate | 12.0 g |
| Polyethylene glycol methacrylate | 4.0 g |
| Styrene macromer | 4.0 g |
| (AS-6 from Toa Gosei Chemical Industry Co., Ltd.) | |
| Mercaptoethanol | 0.4 g |

The mixture was heated to 65° C.

Next, the following components were mixed and the mixture was dropped into the flask over 2.5 hours using the dropping funnel.

| | |
|---|---|
| Styrene | 100.8 g |
| Acrylic acid | 25.2 g |
| Lauryl methacrylate | 108.0 g |
| Polyethylene glycol methacrylate | 36.0 g |
| Hydroxyethyl methacrylate | 60.0 g |
| Styrene macromer | 36.0 g |
| (AS-6 from Toa Gosei Chemical Industry Co., Ltd.) | |
| Mercaptoethanol | 3.6 g |
| Azobisdimethylvaleronitrile | 2.4 g |
| Methyl ethyl ketone | 18.0 g |

Thereafter, a mixture of 0.8 g of azobisdimethylvaleronitrile and 18.0 g of methyl ethyl ketone was dropped into the flask over 0.5 hours using the dropping funnel.

After the reaction product in the flask was aged for 1 hour at 65° C., 0.8 g of azobisdimethylvaleronitrile was fed into the flask, and the mixture was further aged for 1 hour. Thereafter, 364.0 g of methyl ethyl ketone was fed into the flask.

Thus, 800 g of a [polymer solution] having a solid content of 50% by weight was prepared.

Preparation Example 5

Preparation of Dispersion of Particulate Polymer Including Phthalocyanine Pigment The following components were mixed by agitation.

| | |
|---|---|
| Polymer solution prepared above | 28 g |
| Phthalocyanine pigment | 26 g |
| 1 Mole/L aqueous solution of potassium hydroxide | 13.6 g |
| Methyl ethyl ketone | 20 g |
| Ion-exchanged water | 30 g |

The mixture was kneaded using a triple roll mill. The thus prepared paste was fed into 200 g of ion-exchanged water, and the mixture was fully agitated. Thereafter, methyl ethyl ketone and water were distilled away from the mixture using an evaporator to prepare a [dispersion of a cyan-colored particulate polymer] having a pigment concentration of 30% by weight.

Preparation Example 6

Preparation of Dispersion of Particulate Polymer Including Dimethylquinacridone Pigment The procedure for preparation of the cyan-colored particulate polymer dispersion in Preparation Example 5 was repeated except that the pigment was replaced with Pigment Red 122 to prepare a [dispersion of a magenta-colored particulate polymer].

Preparation Example 7

Preparation of Dispersion of Particulate Polymer Including Monoazoyellow Pigment The procedure for preparation of the cyan-colored particulate polymer dispersion in Preparation Example 5 was repeated except that the pigment was replaced with Pigment Yellow 74 to prepare a dispersion of a yellow-colored particulate polymer.

Preparation Example 8

Preparation of Dispersion of Particulate Polymer Including Carbon Black

The procedure for preparation of the cyan-colored particulate polymer dispersion in Preparation Example 5 was repeated except that the pigment was replaced with a carbon black to prepare a dispersion of a black-colored particulate polymer.

Example 1

A composition was prepared according to the following formulation. After the pH of the composition was adjusted so as to be 9 using a 10% by weight aqueous solution of lithium hydroxide, the composition was filtered using a 0.8 μm membrane filter to prepare an ink composition.

| | |
|---|---|
| Black pigment dispersion | 6 |
| Acrylic-silicone resin emulsion | 2 |
| N,N-diethylacrylamide | 65 |
| Surfactant (DSN403N) | 0.3 |
| Fungicide | 0.05 |
| Defoamer | 0.1 |

Pure ware as added to the above such that total weight as 100 parts by weight.

Example 2

The procedure for preparation of the ink composition in Example 1 was repeated except for changing the formulation as shown in Tables 1-1 to 1-6.

Example 3

The procedure for preparation of the ink composition in Example 1 was repeated except for changing the formulation as shown in Tables 1-1 to 1-6.

Example 4

The procedure for preparation of the ink composition in Example 1 was repeated except changing the formulation as shown in Tables 1-1 to 1-6.

Example 5

The procedure for preparation of the ink composition in Example 1 was repeated except for changing the formulation as shown in Tables 1-1 to 1-6.

Example 6

The procedure for preparation of the ink composition in Example 1 was repeated except for changing the formulation as shown in Tables 1-1 to 1-6.

Example 7

The procedure for preparation of the ink composition in Example 1 was repeated except for changing the formulation as shown in Tables 1-1 to 1-6.

Example 8

The procedure for preparation of the ink composition in Example 1 was repeated except for changing the formulation as shown in Tables 1-1 to 1-6.

Example 9

The procedure for preparation of the ink composition in Example 1 was repeated except for changing the formulation as shown in Tables 1-1 to 1-6.

Example 10

The procedure for preparation of the ink composition in Example 1 was repeated except for changing the formulation as shown in Tables 1-1 to 1-6.

Example 11

The procedure for preparation of the ink composition in Example 1 was repeated except for changing the formulation as shown in Tables 1-1 to 1-6.

Example 12

The procedure for preparation of the ink composition in Example 1 was repeated except for changing the formulation as shown in Tables 1-1 to 1-6.

Example 13

The procedure for preparation of the ink composition in Example 1 was repeated except for changing the formulation as shown in Tables 1-1 to 1-6.

Example 14

The procedure for preparation of the ink composition in Example 1 was repeated except for changing the formulation as shown in Tables 1-1 to 1-6.

Example 15

The procedure for preparation of the ink composition in Example 1 was repeated except for changing the formulation as shown in Tables 1-1 to 1-6.

Example 16

The procedure for preparation of the ink composition in Example 1 was repeated except for changing the formulation as shown in Tables 1-1 to 1-6.

Example 17

The procedure for preparation of the ink composition in Example 1 was repeated except for changing the formulation as shown in Tables 1-1 to 1-6.

Example 18

The procedure for preparation of the ink composition in Example 1 was repeated except for changing the formulation as shown in Tables 1-1 to 1-6.

Example 19

The procedure for preparation of the ink composition in Example 1 was repeated except for changing the formulation as shown in Tables 1-1 to 1-6.

Example 20

The procedure for preparation of the ink composition in Example 1 was repeated except for changing the formulation as shown in Tables 1-1 to 1-6.

Example 21

The procedure for preparation of the ink composition in Example 1 was repeated except for changing the formulation as shown in Tables 1-1 to 1-6.

Example 22

The procedure for preparation of the ink composition in Example 1 was repeated except for changing the formulation as shown in Tables 1-1 to 1-6,

Example 23

The procedure for preparation of the ink composition in Example 1 was repeated except for changing the formulation as shown in Tables 1-1 to 1-6.

Example 24

The procedure for preparation of the ink composition in Example 1 was repeated except for changing the formulation as shown in Tables 1-1 to 1-6.

Comparative Example 1

The procedure for preparation of the ink composition in Example 1 was repeated except for changing the formulation as shown in Tables 1-1 to 1-6.

Comparative Example 2

The procedure for preparation of the ink composition in Example 1 was repeated except for changing the formulation as shown in Tables 1-1 to 1-6.

Comparative Example 3

The procedure for preparation of the ink composition in Example 1 was repeated except for changing the formulation as shown in Tables 1-1 to 1-6.

Comparative Example 4

The procedure for preparation of the ink composition in Example 1 was repeated except for changing the formulation as shown in Tables 1-1 to 1-6.

Comparative Example 5

The procedure for preparation of the ink composition in Example 1 was repeated except for changing the formulation as shown in Tables 1-1 to 1-6.

Comparative Example 6

The procedure for preparation of the ink composition in Example 1 was repeated except for changing the formulation as shown in Tables 1-1 to 1-6.

TABLE 1-1

| Components (% by weight) | | Equilibrium water content | Ex. 1 | Ex. 2 | Ex. 3 | Ex. 4 | Ex. 5 |
| --- | --- | --- | --- | --- | --- | --- | --- |
| Pigment dispersion (weight of solid component) | Preparation Ex. 1 (Black) | | 6 | 6 | 6 | 6 | 6 |
| | Preparation Ex. 2 (Yellow) | | | | | | |
| | Preparation Ex. 3 (Magenta) | | | | | | |
| | Preparation Ex. 4 (Cyan) | | | | | | |
| | Preparation Ex. 6 (Magenta) | | | | | | |
| | Preparation Ex. 7 (Yellow) | | | | | | |
| | Preparation Ex. 5 (Cyan) | | | | | | |
| | Preparation Ex. 8 (Black) | | | | | | |
| Resin dispersion (weight of solid component) | Acrylic-silicone emulsion | | 2 | 2 | 2 | 2 | 2 |
| | Polyurethane resin emulsion | | | | | | |
| Hydrosoluble organic material | Glycerin | 49 | | | | | |
| | 1,3-butanediol | 35 | | | | | |
| | 1,3-dimethyl-2-imidazolidinone | 39 | | | | | |

TABLE 1-1-continued

| Components (% by weight) | | Equilibrium water content | Ex. 1 | Ex. 2 | Ex. 3 | Ex. 4 | Ex. 5 |
|---|---|---|---|---|---|---|---|
| | β-methoxy-N,N-dimethyl propion amide | 33 | | 5 | | 15 | |
| | 2-pyrrolidone | 38 | | | 15 | 15 | |
| | Diethylene glycol isopropyl ether | 22 | | | | | |
| | Triethylene glycol monomethyl ether | 18 | | | | | |
| | Diethylene glycol monoisobutyl ether | 20 | | 5 | 5 | | |
| | Dipropylene glycol monoisobutyl ether | 15 | | | 10 | 10 | |
| | DMAA | 31 | | | | | |
| | DEAA | 13 | 65 | 58 | 30 | 10 | 67 |
| Surfactant | FS-300 | | | | | | |
| | DSN403N | | 0.30 | 0.30 | 0.30 | 0.30 | 0.30 |
| | F444 | | | | | | |
| Penetrant | 2-ethyl-1,3-hexanediol | | | | | | |
| | 2,2,4-trimethyl-1,3-pentanediol | | | | | | |
| Fungicide | Proxel GXL | | 0.05 | 0.05 | 0.05 | 0.05 | 0.05 |
| Defoamer | KM-72 | | 0.1 | 0.1 | 0.1 | 0.1 | 0.1 |
| Pure water | | | Balance | Balance | Balance | Balance | Balance |
| Total (% by weight) | | | 100 | 100 | 100 | 100 | 100 |
| Total amount of hydrosoluble materials | | | 65.45 | 68.45 | 60.45 | 50.45 | 67.45 |

TABLE 1-2

| Components (% by weight) | | Equilibrium water content | Ex. 6 | Ex. 7 | Ex. 8 | Ex. 9 | Ex. 10 |
|---|---|---|---|---|---|---|---|
| Pigment dispersion (weight of solid component) | Preparation Ex. 1 (Black) | | 6 | 6 | 6 | 6 | 6 |
| | Preparation Ex. 2 (Yellow) | | | | | | |
| | Preparation Ex. 3 (Magenta) | | | | | | |
| | Preparation Ex. 4 (Cyan) | | | | | | |
| | Preparation Ex. 6 (Magenta) | | | | | | |
| | Preparation Ex. 7 (Yellow) | | | | | | |
| | Preparation Ex. 5 (Cyan) | | | | | | |
| | Preparation Ex. 8 (Black) | | | | | | |
| Resin dispersion (weight of solid component | Acrylic-silicone emulsion | | 2 | 2 | 2 | 2 | 2 |
| | Polyurethane resin emulsion | | | | | | |

TABLE 1-2-continued

| Components (% by weight) | | Equilibrium water content | Ex. 6 | Ex. 7 | Ex. 8 | Ex. 9 | Ex. 10 |
|---|---|---|---|---|---|---|---|
| Hydrosoluble organic material | Glycerin | 49 | | | | 10 | |
| | 1,3-butanediol | 35 | | | 3 | | |
| | 1,3-dimethyl-2-imidazolidinone | 39 | 5 | | | | |
| | β-methoxy-N,N-dimethyl propion amide | 33 | 5 | 5 | | | 20 |
| | 2-pyrrolidone | 38 | | 5 | | 3 | 30 |
| | Diethylene glycol isopropyl ether | 22 | | | | | |
| | Triethylene glycol monomethyl ether | 18 | | | 17 | | |
| | Diethylene glycol monoisobutyl ether | 20 | 5 | | 15 | 7 | |
| | Dipropylene glycol monoisobutyl ether | 15 | 5 | 8 | | | |
| | DMAA | 31 | | | | | |
| | DEAA | 13 | 30 | 30 | 15 | 30 | 10 |
| Surfactant | ZONYL FS-300 | | | | | | |
| | DSN403N | | 0.05 | 2.00 | 0.30 | 0.30 | 0.30 |
| | MEGAFACE F444 | | | | | | |
| Penetrant | 2-ethyl-1,3-hexanediol | | | | | | |
| | 2,2,4-trimethyl-3-pentanediol | | | | | | |
| Fungicide | Proxel GXL | | 0.05 | 0.05 | 0.05 | 0.05 | 0.05 |
| Defoamer | KM-72F | | 0.1 | 0.1 | 0.1 | 0.1 | 0.1 |
| Pure water | | | Balance | Balance | Balance | Balance | Balance |
| Total (% by weight) | | | 100 | 100 | 100 | 100 | 100 |
| Total amount of hydrosoluble materials | | | 50.2 | 50.15 | 5045 | 50.45 | 60.45 |

TABLE 1-3

| Components (% by weight) | | Equilibrium water content | Ex. 11 | Ex. 12 | Ex. 13 | Ex. 14 | Ex. 15 |
|---|---|---|---|---|---|---|---|
| Pigment dispersion (weight of solid component) | Preparation Ex. 1 (Black) | | 6 | 6 | 6 | 6 | 6 |
| | Preparation Ex. 2 (Yellow) | | | | | | |
| | Preparation Ex. 3 (Magenta) | | | | | | |
| | Preparation Ex. 4 (Cyan) | | | | | | |
| | Preparation Ex. 6 (Magenta) | | | | | | |
| | Preparation Ex. 7 (Yellow) | | | | | | |
| | Preparation Ex. 5 (Cyan) | | | | | | |
| | Preparation Ex. 8 (Black) | | | | | | |
| Resin dispersion (weight of solid component | Acrylic-silicone emulsion | | 2 | 2 | 2 | 2 | 2 |
| | Polyurethane resin emulsion | | | | | | |

TABLE 1-3-continued

| Components (% by weight) | | Equilibrium water content | Ex. 11 | Ex. 12 | Ex. 13 | Ex. 14 | Ex. 15 |
|---|---|---|---|---|---|---|---|
| Hydrosoluble organic material | Glycerin | 49 | | | | | |
| | 1,3-butanediol | 35 | | | | | |
| | 1,3-dimethyl-2-imidazolidinone | 39 | | | 5 | 5 | |
| | β-methoxy-N,N-dimethyl propion amide | 33 | 20 | 5 | 10 | 10 | 15 |
| | 2-pyrrolidone | 38 | 35 | 10 | | | |
| | Diethylene glycol isopropyl ether | 22 | | | | | |
| | Triethylene glycol monomethyl ether | 18 | | | | | |
| | Diethylene glycol monoisobutyl ether | 20 | | 15 | 15 | 15 | 15 |
| | Dipropylene glycol monoisobutyl ether | 15 | | | | | |
| | DMAA | 31 | | 30 | 15 | | |
| | DEAA | 13 | 10 | | 15 | 30 | 30 |
| Surfactant | ZONYL FS-300 | | | | | | 1.0 |
| | DSN403N | | 0.30 | 0.30 | 0.30 | | |
| | MEGAFACE F444 | | | | | 1.00 | |
| Penetrant | 2-ethyl-1,3-hexanediol | | | | | | |
| | 2,2,4-trimethyl-3-pentanediol | | | | | | |
| Fungicide | Proxel GXL | | 0.05 | 0.05 | 0.05 | 0.05 | 0.05 |
| Defoamer | KM-72F | | 0.1 | 0.1 | 0.1 | 0.1 | 0.1 |
| Pure water | | | Balance | Balance | Balance | Balance | Balance |
| Total (% by weight) | | | 100 | 100 | 100 | 100 | 100 |
| Total amount of hydrosoluble materials | | | 65.45 | 60.45 | 60.45 | 61.15 | 61.15 |

TABLE 1-4

| Components (% by weight) | | Equilibrium water content | Ex. 16 | Ex. 17 | Ex. 18 | Ex. 19 | Ex. 20 |
|---|---|---|---|---|---|---|---|
| Pigment dispersion (weight of solid component) | Preparation Ex. 1 (Black) | | 6 | | | | |
| | Preparation Ex. 2 (Yellow) | | | 6 | | | |
| | Preparation Ex. 3 (Magenta) | | | | 6 | | |
| | Preparation Ex. 4 (Cyan) | | | | | 6 | |
| | Preparation Ex. 6 (Magenta) | | | | | | 6 |
| | Preparation Ex. 7 (Yellow) | | | | | | |
| | Preparation Ex. 5 (Cyan) | | | | | | |
| | Preparation Ex. 8 (Black) | | | | | | |
| Resin dispersion (weight of solid component | Acrylic-silicone emulsion | | | 2 | 2 | 2 | |
| | Polyurethane resin emulsion | | | | | | |

TABLE 1-4-continued

| Components (% by weight) | | Equilibrium water content | Ex. 16 | Ex. 17 | Ex. 18 | Ex. 19 | Ex. 20 |
|---|---|---|---|---|---|---|---|
| Hydrosoluble organic material | Glycerin | 49 | | | | | |
| | 1,3-butanediol | 35 | | | | | |
| | 1,3-dimethyl-2-imidazolidinone | 39 | | | | | |
| | β-methoxy-N,N-dimethyl propion amide | 33 | 15 | 15 | 15 | 15 | 15 |
| | 2-pyrrolidone | 38 | | | | | 10 |
| | Diethylene glycol isopropyl ether | 22 | | | | | |
| | Triethylene glycol monomethyl ether | 18 | | | | | |
| | Diethylene glycol monoisobutyl ether | 20 | 15 | 15 | 15 | 15 | 15 |
| | Dipropylene glycol monoisobutyl ether | 15 | | | | | |
| | DMAA | 31 | | | | | |
| | DEAA | 13 | 30 | 30 | 30 | 30 | 30 |
| Surfactant | ZONYL FS-300 | | | | | | |
| | DSN403N | | 0.30 | 0.30 | 0.30 | 0.30 | 0.30 |
| | MEGAFACE F444 | | | | | | |
| Penetrant | 2-ethyl-1,3-hexanediol | | | | | | |
| | 2,2,4-trimethyl-1,3-pentanediol | | | | | | |
| Fungicide | Proxel GXL | | 0.05 | 0.05 | 0.05 | 0.05 | 0.05 |
| Defoamer | KM-72F | | 0.1 | 0.1 | 0.1 | 0.1 | 0.1 |
| Pure water | | | Balance | Balance | Balance | Balance | Balance |
| Total (% by weight) | | | 100 | 100 | 100 | 100 | 100 |
| Total amount of hydrosoluble materials | | | 65.45 | 60.45 | 60.45 | 60.45 | 60.45 |

TABLE 1-5

| Components (% by weight) | | Equilibrium water content | Ex. 21 | Ex. 22 | Ex. 23 | Ex. 24 | Com. Ex. 1 |
|---|---|---|---|---|---|---|---|
| Pigment dispersion (weight of solid component) | Preparation Ex. 1 (Black) | | | | | 6 | 6 |
| | Preparation Ex. 2 (Yellow) | | | | | | |
| | Preparation Ex. 3 (Magenta) | | | | | | |
| | Preparation Ex. 4 (Cyan) | | | | | | |
| | Preparation Ex. 6 (Magenta) | | | | | | |
| | Preparation Ex. 7 (Yellow) | | 6 | | | | |
| | Preparation Ex. 5 (Cyan) | | | 6 | | | |
| | Preparation Ex. 8 (Black) | | | | 6 | | |
| Resin dispersion (weight of solid component | Acrylic-silicone emulsion | | | | | | 2 |
| | Polyurethane resin emulsion | | | | | 2 | |

TABLE 1-5-continued

| Components (% by weight) | | Equilibrium water content | Ex. 21 | Ex. 22 | Ex. 23 | Ex. 24 | Com. Ex. 1 |
|---|---|---|---|---|---|---|---|
| Hydrosoluble organic material | Glycerin | 49 | | | | | 25 |
| | 1,3-butanediol | 35 | | | | | 10 |
| | 1,3-dimethyl-2-imidazolidinone | 39 | 5 | | | 5 | |
| | β-methoxy-N,N-dimethyl propion amide | 33 | 10 | | 5 | 10 | |
| | 2-pyrrolidone | 38 | | 15 | 10 | | 10 |
| | Diethylene glycol isopropyl ether | 22 | | | | | |
| | Triethylene glycol monomethyl ether | 18 | | | | | |
| | Diethylene glycol monoisobutyl ether | 20 | 15 | 15 | 15 | 15 | 5 |
| | Dipropylene glycol monoisobutyl ether | 15 | | | | | |
| | DMAA | 31 | | | | | |
| | DEAA | 13 | 30 | 30 | 30 | 30 | 5 |
| Surfactant | ZONYL FS-300 | | | | | | |
| | DSN403N | | 0.30 | 0.30 | 0.30 | 0.30 | 0.30 |
| | MEGAFACE F444 | | | | | | |
| Penetrant | 2-ethyl-1,3-hexanediol | | | | | | |
| | 2,2,4-trimethyl-1,3-pentanediol | | | | | | |
| Fungicide | Proxel GXL | | 0.05 | 0.05 | 0.05 | 0.05 | 0.05 |
| Defoamer | KM-72F | | 0.1 | 0.1 | 0.1 | 0.1 | 0.1 |
| Pure water | | | Balance | Balance | Balance | Balance | Balance |
| Total (% by weight) | | | 100 | 100 | 100 | 100 | 100 |
| Total amount of hydrosoluble materials | | | 65.45 | 60.45 | 60.45 | 60.45 | 45.45 |

TABLE 1-6

| Components (% by weight) | | Equilibrium water content | Com. Ex. 2 | Com. Ex. 3 | Com. Ex. 4 | Com. Ex. 5 | Com. Ex. 6 |
|---|---|---|---|---|---|---|---|
| Pigment dispersion (weight of solid component) | Preparation Ex. 1 (Black) | | 6 | 6 | 6 | 6 | 6 |
| | Preparation Ex. 2 (Yellow) | | | | | | |
| | Preparation Ex. 3 (Magenta) | | | | | | |
| | Preparation Ex. 4 (Cyan) | | | | | | |
| | Preparation Ex. 6 (Magenta) | | | | | | |
| | Preparation Ex. 7 (Yellow) | | | | | | |
| | Preparation Ex. 5 (Cyan) | | | | | | |
| | Preparation Ex. 8 (Black) | | | | | | |
| Resin dispersion (weight of solid component | Acrylic-silicone emulsion | | 2 | 2 | 2 | 2 | 2 |
| | Polyurethane resin emulsion | | | | | | |

TABLE 1-6-continued

| Components (% by weight) | | Equilibrium water content | Com. Ex. 2 | Com. Ex. 3 | Com. Ex. 4 | Com. Ex. 5 | Com. Ex. 6 |
|---|---|---|---|---|---|---|---|
| Hydrosoluble organic material | Glycerin | 49 | | | | | 20 |
| | 1,3-butanediol | 35 | 10 | | | | 20 |
| | 1,3-dimethyl-2-imidazolidinone | 39 | | | | | |
| | β-methoxy-N,N-dimethyl propion amide | 33 | 15 | | | | |
| | 2-pyrrolidone | 38 | | | 10 | 10 | |
| | Diethylene glycol isopropyl ether | 22 | 15 | | | | |
| | Triethylene glycol monomethyl ether | 18 | | | 10 | | |
| | Diethylene glycol monoisobutyl ether | 20 | 5 | | | 10 | |
| | Dipropylene glycol monoisobutyl ether | 15 | 10 | | | | |
| | DMAA | 31 | | | | | |
| | DEAA | 13 | 5 | 72 | | 18 | 30 |
| Surfactant | ZONYL FS-300 | | | | | | |
| | DSN403N | | 0.30 | 0.30 | 0.30 | 0.30 | 0.30 |
| | MEGAFACE F444 | | | | | | |
| Penetrant | 2-ethyl-1,3-hexanediol | | | | | | |
| | 2,2,4-trimethyl-1,3-pentanediol | | | | | | |
| Fungicide | Proxel GXL | | 0.05 | 0.05 | 0.05 | 0.05 | 0.05 |
| Defoamer | KM-72F | | 0.1 | 0.1 | 0.1 | 0.1 | 0.1 |
| Pure water | | | Balance | Balance | Balance | Balance | Balance |
| Total (% by weight) | | | 100 | 100 | 100 | 100 | 100 |
| Total amount of hydrosoluble materials | | | 65.45 | 72.45 | 20.45 | 38.45 | 70.45 |

The details of the above-mentioned materials and the marketed products are as follows.

(1) Acrylic-silicone resin emulsion: POLYSOL ROY 6312 from Showa Highpolymer Co., Ltd. which has a solid content of 40% by weight, an average particle diameter of 171 nm, and a minimum film forming temperature (MFT) of 20° C.

(2) Polyurethane resin emulsion: HYDRAN APX-101H from DIC Corp. which has a solid content of 45% by weight, an average particle diameter of 160 nm, and a minimum film forming temperature (MFT) of 20° C.

(3) DMAA: N,N-dimethylacrylamide (4) DEAA: N,N-diethylacrylamide (5) ZONYL FS-300: Polyoxyethylene perfluoroalkyl ether from Du Pont which includes effective components in an amount of 40% by weight.

(6) DSN403N: Fluorine-containing surfactant from DAIKIN INDUSTRIES, ltd. which includes effective components in an amount of not less than 98% by weight.

(7) MEGAFACE F-444: Fluorine-containing surfactant from DIC Corporation which is a perfluroalkyl group containing ethylene oxide adduct and which includes effective components in an amount of 100% by weight.

(8) PROXEL GXL: Fungicide from Avecia Ltd. which includes 1,2-benzoisothiazoline-3-one as a main component in an amount of 20% by weight and which includes dipropylene glycol.

(9) KM-72F: Self-emulsification type silicone deforming agent from Shin-Etsu Chemical Co., Ltd. which includes effective components in an amount of 100% by weight.

[Evaluation]

The inks of Examples 1 to 24 and Comparative Examples 1 to 6 were evaluated as follows. The results are shown in Tables 2-1 to 2-3

—Preparation of Printed Image Evaluation—

Each of the inks was ejected by an inkjet printer (IPSIO GXE-5500 from Ricoh Co., Ltd.) under environmental conditions of 23° C. and 50% RH to form a square solid image of each color on a recording medium. In this regard, the driving voltage of the piezoelectric element was changed so that the amounts of the ejected inks are equal, and therefore the inks are adhered to the recording medium in the same amounts. The square solid image pattern was prepared using Microsoft Word 2000, and the color setting conditions of the RGB color mode were as follows.

Black square solid image: Red: 0, Green: 0, Blue: 0
Yellow square solid image: Red: 255, Green: 255, Blue: 0
Magenta square solid image: Red: 255, Green: 0, Blue: 255
Cyan square solid image: Red: 0, Green: 0, Blue: 255

<Curl Evaluation>

A square solid image having substantially the same size of the recording paper, which was prepared using Microsoft Word 2000, was formed on the recording paper. In this regard, the print mode of the printer was set to a "plain paper-standard, high speed" mode using a driver attached to the printer, and the color matching function was not used. The recording paper bearing the solid image was set on a flat table within 5 seconds after image formation in such a manner that the image faces the surface of the table, and the heights of four edge portions of the recording paper were measured with a scale to determine curl of the recording paper.

The curl was measured (1) in 10 sec after a paper was discharged and (2) when one hour passed after a paper was discharged.

A curled up paper was determined to have heights of four edge portions greater than 60 mm (>60).

<Image Density>

A color image of a chart including a 64 point solid square image, which was prepared using Microsoft Word 2000, was recorded on the recording paper mentioned above. In this regard, the print mode of the inkjet printer was set to a "plain paper-standard, high speed" mode using a driver attached to the printer, and the color matching function of the printer was not used. The image density of the square solid image was measured with a spectrodensitometer X-RITE 938 from X-Rite Corp.

<Offset Property of Image>

A color image of the chart was formed by the method used for the evaluation of image density. A cylindrical polyethylene roller having a diameter of 40 mm was rotated on the portion of the solid image having a length of 40 mm at a pressure of 5N. The optical density of a portion of the recording paper to which the solid image is re-transferred via the polyethylene roller was measured with the spectrodensitometer X-RITE 938 from X-Rite Corp. In this regard, the mode of the printer was set to s a "plain paper-standard, clear" mode, and the color matching function of the printer was not used.

An ink having poor dryability contacts a feed roller when a recording medium is transferred after printed while the printed surface is not dried, and the ink adheres to the roller and stain images. This phenomenon is called offset, which shows the ink dryability.

[Evaluation Standard]
Good: less than 0.10
Fair: Not less than 0.10 and less than 0.2
Poor: Not less than 0.2

<Fixability>

A color image of a chart including a square solid image with a size of 3 cm×3 cm, which was prepared using Microsoft Word 2000, was formed on the recording paper mentioned above.

After the image was dried for 24 hours under environmental conditions of 23±1° C. and 50±10% RH, the solid square image was rubbed back and forth five times (i.e., ten-time rubbing) with a cloth of cotton No. 3, which is defined in JIS L0803 and which is attached to a CM-1 type clock meter using a double-stick tape. The optical density of the cotton cloth was measured with the spectrodensitometer X-RITE 938 from X-Rite Corp. before and after the rubbing test to determine the difference between the optical density of the portion of the cotton cloth used for rubbing and the optical density of the cotton cloth before the rubbing test (i.e., background density of the cotton cloth). The fixability of image was graded as follows.

[Evaluation Standard]
Good: The optical density difference was not less than 0.05 and less than 0.1.
Fair: The optical density difference was not less than 0.1 and less than 0.2.

<Discharge Stability>

Two hundreds (200) copies of an A-4 size color image of a chart including square solid images and having an image area proportion of 5%, which was prepared using Microsoft Word 2000, was continuously formed using MyPaper from Ricoh Business Expert Co., Ltd. to determine whether or not the ink is stably discharged from the nozzles under environmental conditions of 23±1° C. and 50±10% RH. In this regard, the print mode of the printer was set to a mode which is a "plain paper-standard, high speed" mode modified so as not to be subjected to color compensation using a driver attached to the printer. The discharge stability of the ink was graded as follows.

[Evaluation Standard]
Good: The ink was ejected stably.
Fair: The ink was ejected slightly unstably.
Poor: The solid images had omissions formed due to non-ejection of the ink.

<Interntittent Discharge Stability>

After 2 hours passed since the head had been cleaned under environmental conditions of 35±1° C. and 15±5% RH, one copy of an A-4 size color image of a chart including square solid images and having an image area proportion of 5%, which was prepared using Microsoft Word 2000, was continuously formed using MyPaper from Ricoh Business Expert Co., Ltd. to determine whether or not the ink is stably discharged from the nozzles under environmental conditions of 23±1° C. and 50±10% RH. In this regard, the print mode of the printer was set to a mode which is a "plain paper-standard, high speed" mode modified so as not to be subjected to color compensation using a driver attached to the printer, The discharge stability of the ink was graded as follows.

[Evaluation Standard]
Good: The ink was ejected stably.
Fair: The ink was ejected slightly unstably.
Poor: The solid images had omissions formed due to non-ejection of the ink.

*MyPaper: high quality paper from Ricoh Business Expert Co., Ltd., which has a weight of 69.6 g/m$^2$, a sizing degree of 23.2 sec and an air permeability of 21 sec.

<Dynamic Surface Tension>

The dynamic surface tension of an ink was measured with a surface tensiometer SITA DYNOTESTER (from Sita Messtechnik GmbH) under conditions of 23±3° C. in temperature and 15 ms in measuring time (i.e., time from formation of bubbles to measurement of surface tension) using a maximum bubble pressure method.

<Preservability of Ink>

Each ink was allowed to settle in a chamber heated to 65° c. for 4 weeks. The viscosity of the ink was measured before and after the preservation test to determine the change rate of the viscosity (25° C.).

[Evaluation Standard]
Good: The viscosity change rate was less than 5%.
Fair: The viscosity change rate was not less than 5% and less than 10%
Poor: The viscosity change rate was not less than 10%

TABLE 2-1

|  | Hydrosoluble organic material (% by weight) | Viscosity (mPas) | Dynamic surface tension (mN/m) (15 ms) | Image density |
|---|---|---|---|---|
| Example 1 | 65.45 | 7.7 | 29.8 | 1.06 |
| Example 2 | 68.45 | 8.7 | 29.7 | 1.18 |
| Example 3 | 60.45 | 9.1 | 29.8 | 1.21 |
| Example 4 | 50.45 | 8.0 | 30.1 | 1.25 |
| Example 5 | 67.45 | 7.9 | 29.8 | 1.05 |
| Example 6 | 50.20 | 7.2 | 38.7 | 1.16 |
| Example 7 | 50.15 | 6.8 | 24.5 | 1.21 |
| Example 8 | 50.45 | 9.5 | 29.8 | 1.25 |
| Example 9 | 50.45 | 8.7 | 29.8 | 1.25 |
| Example 10 | 60.45 | 9.1 | 29.8 | 1.07 |
| Example 11 | 65.45 | 9.9 | 29.8 | 1.05 |
| Example 12 | 60.45 | 8.7 | 29.8 | 1.21 |
| Example 13 | 60.45 | 8.9 | 29.7 | 1.21 |
| Example 14 | 61.15 | 9.1 | 34.5 | 1.20 |
| Example 15 | 61.15 | 9.2 | 32.5 | 1.20 |
| Example 16 | 60.45 | 9.0 | 29.8 | 1.21 |
| Example 17 | 60.45 | 8.9 | 29.8 | 0.76 |
| Example 18 | 60.45 | 9.1 | 29.8 | 0.96 |
| Example 19 | 60.45 | 9.2 | 29.7 | 1.01 |
| Example 20 | 60.45 | 10.9 | 29.8 | 0.94 |
| Example 21 | 60.45 | 10.8 | 30.1 | 0.74 |
| Example 22 | 60.45 | 10.8 | 29.8 | 0.99 |
| Example 23 | 60.45 | 10.9 | 29.8 | 1.18 |
| Example 24 | 60.45 | 9.0 | 29.7 | 1.21 |
| Comparative Example 1 | 45.45 | 12.7 | 29.8 | 1.28 |
| Comparative Example 2 | 60.45 | 12.4 | 29.8 | 1.21 |
| Comparative Example 3 | 72.45 | 8.5 | 30.1 | 1.04 |
| Comparative Example 4 | 20.45 | 3.7 | 29.8 | 1.48 |
| Comparative Example 5 | 38.45 | 5.8 | 29.7 | 1.33 |
| Comparative Example 6 | 70.45 | 16.2 | 29.8 | 1.04 |

TABLE 2-2

|  | Offset | Fixability | Curl after 10 sec | Curl after 1 hr |
|---|---|---|---|---|
| Example 1 | Good | Good | 10 | 5 |
| Example 2 | Good | Good | 6 | 5 |
| Example 3 | Good | Good | 19 | 5 |
| Example 4 | Good | Good | 36 | 5 |
| Example 5 | Good | Good | 8 | 5 |
| Example 6 | Fair | Good | 36 | 5 |
| Example 7 | Good | Good | 36 | 5 |
| Example 8 | Good | Good | 35 | 5 |
| Example 9 | Good | Good | 23 | 5 |
| Example 10 | Good | Good | 5 | 5 |
| Example 11 | Good | Good | 5 | >60 |
| Example 12 | Good | Good | 20 | 5 |
| Example 13 | Good | Good | 19 | 5 |
| Example 14 | Good | Good | 20 | 5 |
| Example 15 | Good | Good | 18 | 5 |
| Example 16 | Good | Fair | 23 | 5 |
| Example 17 | Good | Good | 19 | 5 |
| Example 18 | Good | Good | 20 | 5 |
| Example 19 | Good | Good | 20 | 5 |
| Example 20 | Good | Good | 24 | 5 |
| Example 21 | Good | Good | 23 | 5 |
| Example 22 | Good | Good | 23 | 5 |
| Example 23 | Good | Good | 24 | 5 |
| Example 24 | Good | Good | 20 | 5 |
| Comparative Example 1 | Good | Good | 36 | 5 |
| Comparative Example 2 | Good | Good | 20 | 5 |
| Comparative Example 3 | Good | Good | 0 | 5 |
| Comparative Example 4 | Poor | Good | >60 | 5 |
| Comparative Example 5 | Fair | Good | 55 | 5 |
| Comparative Example 6 | Good | Good | 3 | 5 |

TABLE 2-3

|  | Discharge stability | Intermittent discharge stability | Preservability |
|---|---|---|---|
| Example 1 | Good | Fair | Good |
| Example 2 | Good | Good | Good |
| Example 3 | Good | Good | Good |
| Example 4 | Good | Good | Good |
| Example 5 | Good | Fair | Good |
| Example 6 | Good | Good | Good |
| Example 7 | Fair | Fair | Good |
| Example 8 | Good | Fair | Good |
| Example 9 | Good | Good | Good |
| Example 10 | Good | Good | Good |
| Example 11 | Good | Good | Good |
| Example 12 | Good | Good | Fair |
| Example 13 | Good | Good | Good |
| Example 14 | Good | Good | Good |
| Example 15 | Good | Good | Good |
| Example 16 | Good | Good | Good |
| Example 17 | Good | Good | Good |
| Example 18 | Good | Good | Good |
| Example 19 | Good | Good | Good |
| Example 20 | Fair | Fair | Fair |
| Example 21 | Fair | Fair | Fair |
| Example 22 | Fair | Fair | Fair |
| Example 23 | Fair | Fair | Fair |
| Example 24 | Good | Good | Good |
| Comparative Example 1 | Poor | Poor | Good |
| Comparative Example 2 | Poor | Poor | Good |
| Comparative Example 3 | Good | Fair | Poor |
| Comparative Example 4 | Poor | Poor | Good |
| Comparative Example 5 | Good | Good | Good |
| Comparative Example 6 | Poor | Poor | Good |

Having now fully described the invention, it will be apparent to one of ordinary skill in the art that many changes and modifications can be made thereto without departing from the spirit and scope of the invention as set forth therein.

What is claimed is:

1. An ink for inkjet, comprising:
   water; and
   a mixture of hydrosoluble organic materials in an amount of from 40 to 70% by weight,
   wherein the mixture of hydrosoluble organic materials comprises
   (a) at least one of diethylene glycol mono-isobutyl ether and dipropylene glycol mono-isobutyl ether, in an amount of from 5 to 30% by weight, based on total weight of the ink, and
   (b) N,N-dimethylacrylamide and N,N-diethylacrylamide, the total content of said N,N-dimethylacrylamide and N,N-diethylacrylamide being from 20% to 50% by weight based on total weight of the ink.

2. The ink for inkjet of claim 1, wherein the ink has a viscosity of from 6 to 10 mPas.

3. The ink for inkjet of claim 1, wherein the mixture of hydrosoluble organic materials comprises a hydrosoluble organic material having an equilibrium water content not less than 33% by weight at 23° C. and 80% RH in an amount of from 5 to 50% by weight, based on total weight of the ink.

4. The ink for inkjet of claim 3, wherein the hydrosoluble organic material is at least one of 1,3-dimethyl-2-imidazolidinone, β-methoxy-N,N-dimethylpropion amide and 2-pyrrolidone.

5. The ink for inkjet of claim 1, further comprising a pigment.

6. An ink cartridge comprising a container configured to contain the ink for inkjet according to claim 1.

7. An inkjet recorder comprising the ink cartridge according to claim 6.

8. An ink recorded matter, comprising:
a recording medium; and
an image formed with the ink for n according to claim 1, located on the recording medium.

9. The ink for inkjet of claim 1, wherein the ink has a dynamic surface tension of from 25 to 35 mN/m at 25° C. and 15 ms.

\* \* \* \* \*